US012254064B2

(12) United States Patent
Chen et al.

(10) Patent No.: US 12,254,064 B2
(45) Date of Patent: Mar. 18, 2025

(54) IMAGE GENERATION METHOD, NEURAL NETWORK COMPRESSION METHOD, AND RELATED APPARATUS AND DEVICE

(71) Applicant: HUAWEI TECHNOLOGIES CO., LTD., Guangdong (CN)

(72) Inventors: Hanting Chen, Beijing (CN); Yunhe Wang, Beijing (CN); Chuanjian Liu, Beijing (CN); Kai Han, Beijing (CN); Chunjing Xu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 465 days.

(21) Appl. No.: 17/488,735

(22) Filed: Sep. 29, 2021

(65) Prior Publication Data
US 2022/0019855 A1 Jan. 20, 2022

Related U.S. Application Data

(63) Continuation of application No. PCT/CN2020/082599, filed on Mar. 31, 2020.

(30) Foreign Application Priority Data

Mar. 31, 2019 (CN) .......................... 201910254752.3

(51) Int. Cl.
G06F 18/214 (2023.01)
G06F 18/243 (2023.01)
G06N 3/047 (2023.01)

(52) U.S. Cl.
CPC ........ G06F 18/2148 (2023.01); G06F 18/243 (2023.01); G06N 3/047 (2023.01)

(58) Field of Classification Search
CPC .. G06F 18/2148; G06F 18/243; G06F 18/213; G06N 3/047; G06N 3/045;
(Continued)

(56) References Cited

U.S. PATENT DOCUMENTS

2018/0336439 A1* 11/2018 Kliger .................... G06N 3/088
2018/0336471 A1* 11/2018 Rezagholizadeh .... G06N 3/047
(Continued)

FOREIGN PATENT DOCUMENTS

CN 107563428 A 1/2018
CN 109284786 A 1/2019
(Continued)

OTHER PUBLICATIONS

Yaxing Wang et al.,"Transferring GANs: generating images from limited data", Oct. 2, 2018,total:17pages.
(Continued)

Primary Examiner — Syed Haider
(74) Attorney, Agent, or Firm — WOMBLE BOND DICKINSON (US) LLP

(57) ABSTRACT

The present application discloses an image generation method, a neural network compression method, and a related apparatus and device in the field of artificial intelligence. The image generation method includes: inputting a first matrix into an initial image generator to obtain a generated image; inputting the generated image into a preset discriminator to obtain a determining result, where the preset discriminator is obtained through training based on a real image and a category corresponding to the real image; updating the initial image generator based on the determining result to obtain a target image generator; and further inputting a second matrix into the target image generator to obtain a sample image. Further, a neural network compression method is disclosed, to compress the preset discriminator based on the sample image obtained by using the foregoing image generation method.

20 Claims, 12 Drawing Sheets

(58) Field of Classification Search
CPC ........ G06N 3/084; G06N 3/044; G06N 3/088; G06V 10/774; G06V 40/174
See application file for complete search history.

(56) References Cited

U.S. PATENT DOCUMENTS

2020/0202174 A1* 6/2020 Lin ................ G06V 10/774
2021/0374911 A1* 12/2021 Kudo ............... G06T 3/4046

FOREIGN PATENT DOCUMENTS

| CN | 109344921 A | 2/2019 |
|---|---|---|
| CN | 109508669 A | 3/2019 |
| CN | 109543753 A | 3/2019 |
| CN | 110084281 A | 8/2019 |

OTHER PUBLICATIONS

Hui Jonathan et al., "CAN what is generative Adversarial Networks can",Jun. 19, 2018,total:9pages.

Tim Salimans et al., "Improved Techniques for Training GANs",Jun. 10, 2016,total:10pages.

Yang Zhao et al., "Self-Adversarially Learned Bayesian Sampling",Nov. 21, 2018,total:8pages.

Vasileios Belagiannis et al., "Adversarial Network Compression",2019year, total:19pages.

Huyeeeee et al., "Transferring GANs: generating images from limited data The understanding of the paper",Nov. 26, 2018,total:5pages.

Anonymous CVPR submission, No Free-Lunch Privacy in Shared Deep Neural Networks, CVPR 2019 Submission #965, 2019, 9 pages.

Augustus Odena: "Semi-Supervised Learning with Generative Adversarial Networks", arxiv.org, Cornell University Library, 201 Olin Library Cornell University Ithaca, NY 14853, Jun. 6, 2016 (Jun. 6, 2016), XP080706029, 3 pages.

Raphael Gontijo Lopes et al: "Data-Free Knowledge Distillation for Deep Neural Networks", arxiv.org, Cornell University Library, 201 Olin Library Cornell University Ithaca, NY 14853, Oct. 19, 2017 (Oct. 19, 2017), XP081283682, 8 pages.

Cheng Yu et al: "IEEE Signal Processing Magazine, Special Issue on Deep Learning for Image Understanding (Arxiv Extended Version) A Survey of Model Compression and Acceleration for Deep Neural Networks", Feb. 7, 2019 (Feb. 7, 2019), XP055910879, 10 pages.

* cited by examiner

IMAGE GENERATION METHOD, NEURAL NETWORK COMPRESSION METHOD, AND RELATED APPARATUS AND DEVICE

CROSS-REFERENCE TO RELATED APPLICATIONS

This application is a continuation of International Application No. PCT/CN2020/082599, filed on Mar. 31, 2020, which claims priority to Chinese Patent Application No. 201910254752.3, filed on Mar. 31, 2019, The disclosures of the aforementioned applications are hereby incorporated by reference in their entireties.

TECHNICAL FIELD

This application relates to the field of artificial intelligence technologies, and in particular, to an image generation method, a neural network compression method, and a related apparatus and device.

BACKGROUND

With development of deep learning technologies, machine learning models such as a neural network (neural network, NN) model and a deep neural network (deep neural networks, DNN) model have been applied to various fields, for example, image classification, object detection, and speech recognition. Generally, a machine learning model obtained through training has a large quantity of complex network structures and includes a large quantity of model parameters. Therefore, huge calculation resources are needed to run the machine learning model, and it is difficult to directly apply the machine learning model to a small mobile device such as a mobile phone, a tablet computer, an on-board unit (on board unit, OBU), or a camera. In this case, the machine learning model needs to be compressed to reduce calculation resources required for the machine learning model and accelerate running of the machine learning model.

According to existing neural network compression and acceleration algorithms, calculation is usually performed based on a training sample of a to-be-compressed machine learning model. However, in real life, a real training sample is usually protected by a privacy policy or a law, and cannot be obtained by a third party. In addition, a structure of a machine learning model that needs to be compressed is often invisible, and only input and output interfaces are provided. Therefore, when there is no real training sample, most neural network compression technologies cannot be used. Therefore, how to generate a training sample is a technical problem urgently to be resolved to compress a neural network when there is no real training sample.

In the prior art, a generative adversarial network (generative adversarial networks, GAN) is usually used to generate a training sample. The GAN usually includes a generator and a discriminator. The generator and the discriminator learn from each other through mutual gaming, to generate a better output. The generator captures potential distribution of real training samples and generates new samples. The discriminator is a binary classifier, and is used to determine whether an input sample is a real sample or a generated sample. The generator and the discriminator are iteratively optimized. In this way, when the discriminator cannot correctly determine a data source of the input sample, it can be considered that the generator has learned distribution of real training data. In this way, based on an existing real training sample, the generator can generate a sample similar to the real training sample. However, the generator needs to be trained by using a real training sample. When the real training sample cannot be obtained, the GAN cannot be trained, and a sample similar to the real training sample cannot be obtained.

SUMMARY

Embodiments of this application provide an image generation method, a neural network compression method, and a related apparatus and device. In this way, when there is no real image, a sample image similar to a real image can be generated, and a neural network can be compressed.

According to a first aspect, an embodiment of this application provides an image generator training method, including:

A training device inputs a first matrix into an initial image generator to obtain a generated image, where the initial image generator is a deep neural network; inputs the generated image into a preset discriminator to obtain a determining result, where the preset discriminator is obtained through training based on first training data, and the first training data includes a real image and a category corresponding to the real image; and further updates the initial image generator based on the determining result to obtain a target image generator.

It should be understood that the initial image generator may be an initial deep neural network, or may be a deep neural network obtained in a training process.

The training device may be a terminal device, for example, a mobile phone, a tablet computer, a desktop computer, a portable notebook computer, an AR/VR terminal, or a vehicle-mounted terminal, or may be a server, a cloud, or the like.

According to the foregoing method, the target image generator can be obtained through training, without using the real image used for obtaining the preset discriminator through training. In addition, the target image generator obtained through training may be used to generate a sample image that has a feature similar to a feature of the real image used for obtaining the preset discriminator through training. The sample image may replace training data of the preset discriminator, to implement a function that requires the training data of the preset discriminator, for example, compression of the preset discriminator.

It should be understood that, in an application scenario, the preset discriminator may be an image recognition network. The image recognition network may be used to recognize a category to which an input image belongs. In another application scenario, the preset discriminator may be a facial attribute recognition network. The facial attribute recognition network may be used to recognize an attribute of a person described in an input face image, for example, an age, a gender, or an emotion.

In an optional implementation, the determining result may include a probability that the generated image is predicted as each of M categories, and M is an integer greater than 1.

In an optional implementation, a first implementation in which the training device updates the initial image generator based on the determining result may be: determining a maximum probability in probabilities corresponding to the M categories, and determining, as a real result of the generated image, a category corresponding to the maximum probability; and further updating the initial image generator based on a difference between the determining result and the real result.

According to the foregoing method, the training device determines the real result based on the determining result that is output by the preset discriminator for the generated image, updates the initial image generator based on the difference between the determining result and the real result, and further obtains, when there is no real image, the target image generator through training. In addition, the training device determines, based on the determining result, that the real result is the category corresponding to the maximum probability. This can reduce the difference between the determining result and the real result, and improve operation efficiency of the training process.

In an optional implementation, before the updating the initial image generator based on the determining result, the method further includes: The training device extracts a feature of the generated image by using the preset discriminator. A second implementation in which the training device updates the initial image generator based on the determining result may be: determining a maximum probability in probabilities corresponding to the M categories, and determining, as a real result of the generated image, a category corresponding to the maximum probability; and further updating the initial image generator based on the feature and a difference between the determining result and the real result.

According to the foregoing method, when there is no real image, the target image generator can be obtained through training. In addition, in a process of training the initial image generator, a characteristic of the feature that is extracted from the input real image by using the preset discriminator is considered, and the feature of the generated image is constrained. In this way, the sample image generated by the target image generator obtained through training approximates the real image.

In an optional implementation, a third implementation in which the training device updates the initial image generator based on the determining result may be: determining a maximum probability in probabilities corresponding to the M categories, and determining, as a real result of the generated image, a category corresponding to the maximum probability; obtaining, based on N determining results that one-to-one correspond to N first matrices, an average probability value of each of the M categories in the N determining results, where N is a positive integer; and updating the initial image generator based on the average probability value and a difference between the determining result and the real result.

According to the foregoing method, when there is no real image, the target image generator can be obtained through training. In addition, in a process of training the initial image generator, the determining result of the generated image is constrained. In this way, the target image generator can evenly generate sample images for all the categories, to avoid that the target image generator is trapped into local optimization.

In an optional implementation, before the updating the initial image generator based on the determining result, the method further includes: The training device extracts a feature of the generated image by using the preset discriminator. A fourth implementation in which the initial image generator is updated based on the determining result may be: determining a maximum probability in probabilities corresponding to the M categories, and determining, as a real result of the generated image, a category corresponding to the maximum probability; obtaining, based on N determining results that one-to-one correspond to N first matrices, an average probability value of each of the M categories in the N determining results; and further updating the initial image generator based on a difference between the determining result and the real result, an eigenvalue of the feature, and the average probability value.

According to a second aspect, an embodiment of this application provides an image generation method, including:
An execution device inputs a second matrix into a target image generator to obtain a sample image, where the target image generator is obtained by using any image generator training method described in the first aspect.

The execution device may be a terminal device, for example, a mobile phone, a tablet computer, a desktop computer, a portable notebook computer, an AR/VR terminal, or a vehicle-mounted terminal, or may be a server, a cloud, or the like.

According to the foregoing method, the target image generator obtained through training by using the training method described in the first aspect can generate the sample image that has a feature similar to a feature of a real image used for training a preset discriminator. The sample image may replace training data of the preset discriminator, to implement a function that requires the training data of the preset discriminator, for example, compression of the preset discriminator.

According to a third aspect, an embodiment of this application further provides a neural network compression method, including:

A compression device obtains a sample image, where the sample image is generated by using any image generation method described in the second aspect, and a preset discriminator is a to-be-compressed neural network; inputs the sample image into the to-be-compressed neural network to obtain a category corresponding to the sample image; and further compresses the to-be-compressed neural network based on the sample image and the category corresponding to the sample image, to obtain a compressed neural network, where the compressed neural network has fewer parameters than the to-be-compressed neural network.

The compression device may be a server, a cloud, or the like.

According to the foregoing method, the sample image that has a feature similar to a feature of a real image used for training the preset discriminator is obtained by using the image generation method described in the second aspect, and the to-be-compressed neural network is compressed based on the sample image and the category corresponding to the sample image. In this way, the to-be-compressed neural network can be compressed, without using training data.

According to a fourth aspect, an embodiment of this application further provides an image processing method, including:

A terminal receives an input image; inputs the input image into a compressed neural network, and processes the input image by using the compressed neural network, to obtain a processing result, where the compressed neural network is obtained by using the neural network compression method described in the third aspect; and finally outputs the processing result.

It should be understood that content of the processing result depends on a function of the compressed neural network, and may be an image classification result, an image recognition result, or the like, where the function of the compressed neural network depends on a function of a to-be-compressed neural network. For example, the to-be-compressed neural network is a facial attribute recognition network, and is used to recognize an attribute of a person described in an input face image, for example, a gender, an age. In this case, the compressed neural network can recognize the gender, the age, or the like of the person described in the input image, and the processing result may include the gender, the age that is recognized in the input image.

It should be further understood that, compared with the to-be-compressed neural network, the compressed neural network has a simpler network structure and fewer parameters, and occupies a few storage resources during running. Therefore, the compressed neural network may be applied to a lightweight terminal.

It should be further understood that the terminal may be a mobile phone, a tablet computer, a desktop computer, a portable notebook computer, an AR/VR terminal, a vehicle-mounted terminal, another terminal device, or the like.

According to a fifth aspect, an embodiment of this application provides a text generator training method, including: A training device inputs a first matrix into an initial text generator to obtain generated text, where the initial text generator is a deep neural network; inputs the generated text into a preset discriminator to obtain a determining result, where the preset discriminator is obtained through training based on first training data, and the first training data includes real text and a category corresponding to the real text; and further updates the initial text generator based on the determining result to obtain a target text generator.

It should be understood that the initial sample generator may be an initial deep neural network, or may be a deep neural network obtained in a training process.

The training device may be a terminal device, for example, a mobile phone, a tablet computer, a desktop computer, a portable notebook computer, an AR/VR terminal, or a vehicle-mounted terminal, or may be a server, a cloud, or the like.

In an application scenario, the preset discriminator may be a text recognition network. The text recognition network is used to recognize a category of input text. The category may be obtained through classification based on a criterion such as an intention or a subject.

According to the foregoing method, the target text generator can be obtained through training, without using the real text used for obtaining the preset discriminator through training. In addition, the target text generator obtained through training may be used to generate sample text that has a feature similar to a feature of the real text used for obtaining the preset discriminator through training. The sample text may replace training data of the preset discriminator, to implement a function that requires the training data of the preset discriminator, for example, compression of the preset discriminator.

In an optional implementation, the determining result may include a probability that the generated text is predicted as each of M categories, and M is an integer greater than 1.

In an optional implementation, a first implementation in which the training device updates the initial text generator based on the determining result may be: determining a maximum probability in probabilities corresponding to the M categories, and determining, as a real result of the first generated sample, a category corresponding to the maximum probability; and further updating the initial text generator based on a difference between the determining result and the real result.

According to the foregoing method, the training device determines the real result based on the determining result that is output by the preset discriminator for the generated text, updates the initial text generator based on the difference between the determining result and the real result, and further obtains, when there is no real text, the target text generator through training. In addition, the training device determines, based on the determining result, that the real result is the category corresponding to the maximum probability. This can reduce the difference between the determining result and the real result, and improve operation efficiency of the training process.

In an optional implementation, before the updating the initial text generator based on the determining result, the method further includes: The training device extracts a feature of the generated text by using the preset discriminator. In this case, a second implementation in which the training device updates the initial text generator based on the determining result may be: determining a maximum probability in probabilities corresponding to the M categories, and determining, as a real result of the first generated sample, a category corresponding to the maximum probability; and further updating the initial text generator based on the feature and a difference between the determining result and the real result.

According to the foregoing method, when there is no real text, the target text generator can be obtained through training. In addition, in a process of training the initial text generator, a characteristic of the feature that is extracted from the input real text by using the preset discriminator is considered, and the feature of the generated text is constrained. In this way, the sample text generated by the target text generator obtained through training approximates the real text.

In an optional implementation, a third implementation in which the training device updates the initial text generator based on the determining result may be: determining a maximum probability in probabilities corresponding to the M categories, and determining, as a real result of the first generated sample, a category corresponding to the maximum probability; obtaining, based on N determining results that one-to-one correspond to N first matrices, an average probability value of each of the M categories in the N determining results; and updating the initial text generator based on the average probability value and a difference between the determining result and the real result.

According to the foregoing method, when there is no real text, the target text generator can be obtained through training. In addition, in a process of training the initial text generator, the determining result of the generated text is constrained. In this way, the target text generator can evenly generate sample text for all the categories, to avoid that the target image generator is trapped into local optimization.

In an optional implementation, before the updating the initial text generator based on the determining result, the method further includes: The training device extracts a feature of the generated text by using the preset discriminator. In this case, a fourth implementation in which the training device updates the initial text generator based on the determining result may be: determining a maximum probability in probabilities corresponding to the M categories, and determining, as a real result of the first generated sample, a category corresponding to the maximum probability; obtaining, based on N determining results that one-to-one correspond to N first matrices, an average probability value of each of the M categories in the N determining results; and further updating the initial text generator based on a difference between the determining result and the real result, the feature, and the average probability value.

According to a sixth aspect, an embodiment of this application provides a text generation method, including: An execution device inputs a second matrix into a target text generator to obtain sample text. The target text generator is obtained by using any text generator training method described in the fourth aspect.

The execution device may be a terminal device, for example, a mobile phone, a tablet computer, a desktop computer, a portable notebook computer, an AR/VR terminal, or a vehicle-mounted terminal, or may be a server, a cloud, or the like.

According to the foregoing method, the target text generator obtained through training by using the training method described in the fifth aspect can generate the sample text that has a feature similar to a feature of real text used for training a preset discriminator. The sample text may replace training data of the preset discriminator, to implement a function that requires the training data of the preset discriminator, for example, compression of the preset discriminator.

According to a seventh aspect, an embodiment of this application provides a neural network compression method, including: A compression device obtains sample text, where the sample text is generated by using any text generation method described in the fifth aspect, and a preset discriminator is a to-be-compressed neural network; inputs the sample text into the to-be-compressed neural network to obtain a category corresponding to the sample text; and compresses the to-be-compressed neural network based on the sample text and the category corresponding to the sample text, to obtain a compressed neural network, where the compressed neural network has fewer parameters than the to-be-compressed neural network.

According to the foregoing method, the sample text that has a feature similar to a feature of real text used for training the preset discriminator is obtained by using the text generation method described in the sixth aspect, and the to-be-compressed neural network is compressed based on the sample text and the category corresponding to the sample text. In this way, the to-be-compressed neural network can be compressed, without using training data.

According to an eighth aspect, an embodiment of this application provides a text processing method. A terminal receives input text; inputs the input text into a compressed neural network, and processes the input text by using the compressed neural network, to obtain a processing result, where the compressed neural network is obtained by using the neural network compression method described in the sixth aspect; and further outputs the processing result.

It should be understood that content of the processing result depends on a function of the compressed neural network, and may be a text classification result, a text recognition result, or the like, where the function of the compressed neural network depends on a function of a to-be-compressed neural network. For example, the to-be-compressed neural network is a text recognition network, and is used to recognize an intention described in the input text. In this case, the compressed neural network can recognize the intention of the input text, and then perform an operation corresponding to the recognized intention. For example, if the recognized intention is "connecting a call", the terminal (such as a mobile phone) may connect the current call.

It should be further understood that, compared with the to-be-compressed neural network, the compressed neural network has a simpler network structure and fewer parameters, and occupies a few storage resources during running. Therefore, the compressed neural network may be applied to a lightweight terminal.

It should be understood that the terminal may be a mobile phone, a tablet computer, a desktop computer, a portable notebook computer, an AR/VR terminal, a vehicle-mounted terminal, another terminal device, or the like.

According to a ninth aspect, an embodiment of this application further provides a sample generator training method. The method includes: A training device inputs a first matrix into an initial sample generator to obtain a first generated sample, where the initial sample generator is a deep neural network; inputs the first generated sample into a preset discriminator to obtain a determining result, where the preset discriminator is obtained through training based on first training data, and the first training data includes a real sample and a category corresponding to the real sample; and further updates parameters of the initial sample generator based on the determining result of the first generated sample to obtain a target sample generator.

It should be understood that the initial sample generator may be an initial deep neural network, or may be a deep neural network obtained in a training process.

According to the foregoing method, the target sample generator can be obtained through training, without using the real sample used for obtaining the preset discriminator through training. In addition, the target sample generator obtained through training may be used to generate a second generated sample that has a feature similar to a feature of the real sample used for obtaining the preset discriminator through training. The second sample image may replace training data of the preset discriminator, to implement a function that requires the training data of the preset discriminator, for example, compression of the preset discriminator.

In an optional implementation, the determining result may include a probability that the first generated sample is predicted as each of M categories, and M is an integer greater than 1.

In an optional implementation, a first implementation in which the initial sample generator is updated based on the determining result may be: determining a maximum probability in probabilities corresponding to the M categories, and determining, as a real result of the first generated sample, a category corresponding to the maximum probability; and further updating the initial sample generator based on a difference between the determining result and the real result.

According to the foregoing method, the training device determines the real result based on the determining result that is output by the preset discriminator for the first generated sample, updates the initial sample generator based on the difference between the determining result and the real result, and further obtains, when there is no real sample, the target sample generator through training. In addition, the training device determines, based on the determining result, that the real result is the category corresponding to the maximum probability. This can reduce the difference between the determining result and the real result, and improve operation efficiency of the training process.

In an optional implementation, before the updating the initial sample generator based on the determining result, the method further includes: extracting a feature of the first generated sample by using the preset discriminator. In this case, a second implementation in which the initial sample generator is updated based on the determining result may be: determining a maximum probability in probabilities corresponding to the M categories, and determining, as a real result of the first generated sample, a category corresponding to the maximum probability; and further updating the initial sample generator based on the feature and a difference between the determining result and the real result.

According to the foregoing method, when there is no real sample, the target sample generator can be obtained through training. In addition, in a process of training the initial sample generator, a characteristic of the feature that is extracted from the input real sample by using the preset discriminator is considered, and the feature of the first generated sample is constrained. In this way, the second generated sample generated by the target sample generator obtained through training approximates the real sample.

In an optional implementation, a third implementation in which the initial sample generator is updated based on the determining result may be: determining a maximum probability in probabilities corresponding to the M categories, and determining, as a real result of the first generated sample, a category corresponding to the maximum probability; obtaining, based on N determining results that one-to-one correspond to N first matrices, an average probability value of each of the M categories in the N determining results; and updating the initial sample generator based on the average probability value and a difference between the determining result and the real result.

According to the foregoing method, when there is no real sample, the target sample generator can be obtained through training. In addition, in a process of training the initial sample generator, the determining result of the first generated sample is constrained. In this way, the target sample generator can evenly generate second generated samples for all the categories, to avoid that the target image generator is trapped into local optimization.

In an optional implementation, before the updating the initial sample generator based on the determining result, the method further includes: extracting a feature of the first generated sample by using the preset discriminator. In this case, a fourth implementation in which the initial sample generator is updated based on the determining result may be: determining a maximum probability in probabilities corresponding to the M categories, and determining, as a real result of the first generated sample, a category corresponding to the maximum probability; obtaining, based on N determining results that one-to-one correspond to N first matrices, an average probability value of each of the M categories in the N determining results; and further updating the initial sample generator based on a difference between the determining result and the real result, an eigenvalue of the feature, and the average probability value.

According to a tenth aspect, an embodiment of this application further provides a sample generation method. The method includes: An execution device inputs a second matrix into a target sample generator to obtain a second generated sample, where the target sample generator is obtained through training by using any sample generator training method described in the seventh aspect.

According to the foregoing method, the target sample generator can be obtained through training, without using a real sample used for training a preset discriminator. In addition, the target sample generator obtained through training may be used to generate the second generated sample that has a feature similar to a feature of the real sample used for training the preset discriminator. The second generated sample may replace training data of the preset discriminator, to implement a function that requires the training data of the preset discriminator, for example, compression of the preset discriminator.

According to an eleventh aspect, an embodiment of this application further provides a neural network compression method, including: A compression device obtains a second generated sample, where the second generated sample is generated by using any sample generation method described in the eighth aspect, and a preset discriminator is a to-be-compressed neural network; inputs the second generated sample into the to-be-compressed neural network to obtain a category corresponding to the second generated sample; and further compresses the to-be-compressed neural network based on the second generated sample and the category corresponding to the second generated sample, to obtain a compressed neural network, where the compressed neural network has fewer parameters than the to-be-compressed neural network.

The compression device may be a server, a cloud, or the like.

It should be understood that, in another implementation of this embodiment of this application, a training process in which a target sample generator is obtained through training in the foregoing neural network compression method may alternatively be performed by a training device, and a device that performs a process of generating the second generated sample by using the target sample generator may be the same as or different from a device that compresses the to-be-compressed neural network based on the second generated sample.

According to the foregoing method, the second generated sample that has a feature similar to a feature of a real sample used for training the to-be-compressed neural network can be obtained by using the sample generation method described in the tenth aspect, and the to-be-compressed neural network is compressed based on the second generated sample and the category corresponding to the second generated sample. In this way, the to-be-compressed neural network can be compressed when there is no training sample.

In an optional implementation, a determining result includes a probability that a first generated sample is predicted as each of M categories, and M is an integer greater than 1.

According to the foregoing method, it is determined, based on the determining result, that a real result is a category corresponding to a maximum probability. This can reduce a difference between the determining result and the real result, and improve operation efficiency of a training process.

In an optional implementation, a specific implementation in which the compression device compresses the to-be-compressed neural network may be: The compression device inputs the second generated sample into the to-be-compressed neural network, to obtain a real result corresponding to the second generated sample; and trains an initial neural network based on second training data, to obtain the compressed neural network, where the second training data includes the second generated sample and the real result corresponding to the second generated sample, the initial neural network is a deep neural network, and the initial neural network has fewer model parameters than the to-be-compressed neural network.

It can be learned that, according to the neural network compression method provided in this embodiment of this application, the second generated sample that has the feature similar to the feature of the real sample used for training the to-be-compressed neural network is generated by using the target sample generator, and a result obtained by predicting the second generated sample by using the to-be-compressed neural network is used as a label. A neural network whose function is the same as a function of the to-be-compressed neural network is obtained by training a low-complexity neural network based on the second generated sample and the label of the second generated sample. The neural network is the compressed neural network. In this way, the to-be-compressed neural network is compressed when there is no training sample. The compressed neural network may be applied to a lightweight device such as a terminal, to reduce an operation loss, reduce storage overheads, and improve operation efficiency.

In an optional implementation, another implementation in which the compression device compresses the to-be-compressed neural network may be: An execution device inputs the second generated sample into the to-be-compressed neural network, to obtain a real result of the second generated sample; removes, based on importance of neurons in the to-be-compressed neural network, a neuron whose importance is less than a first threshold in the to-be-compressed neural network, to obtain a simplified neural network; and further trains the simplified neural network based on third training data, to obtain the compressed neural network, where the third training data includes the second generated sample and the real result corresponding to the second generated sample.

It can be learned that, according to the neural network compression method provided in this embodiment of this application, the second generated sample that has the feature similar to the feature of the real sample used for training the to-be-compressed neural network is generated by using the target sample generator, a result obtained by predicting the second generated sample by using the to-be-compressed neural network is used as a label, and a redundant connection in the to-be-compressed neural network is removed by using a pruning algorithm, to obtain the simplified neural network. The second generated sample is used as an input of the simplified neural network, the real result obtained by processing the input second generated sample by the to-be-compressed neural network is used as the label, and the simplified neural network is trained by using the second generated sample and the label of the second generated sample, to obtain the compressed neural network. In this way, the to-be-compressed neural network is compressed when there is no training sample. The compressed neural network may be applied to a lightweight device such as a terminal, to reduce complexity of the to-be-compressed neural network, improve operation efficiency, and reduce storage overheads.

It should be understood that, in an embodiment described in a scenario A in specific embodiments, the foregoing neural network compression method can be used to compress an image recognition network. The image recognition network is used to recognize a category to which an input image belongs. In this case, the "initial sample generator" is an "initial image generator", the "to-be-compressed neural network" is the "image recognition network", the "first generated sample" is a "generated image", the "real sample" is a "real image", the "determining result" is a "determined category", the "real result" is a "real category", and the "second generated sample" is a "sample image".

In an embodiment described in a scenario B in the specific embodiments, the foregoing neural network compression method can be used to compress a facial attribute recognition network. The facial attribute recognition network is used to recognize an attribute of a person described in an input face image, for example, an age, a gender, or an emotion. In this case, the "initial sample generator" is an "initial face image generator", the "to-be-compressed neural network" is the "initial face image generator", the "first generated sample" is a "generated face image", the "real sample" is a "real face image", the "determining result" is a "determined attribute", the "real result" is a "real attribute", and the "second generated sample" is a "sample face image".

In an embodiment described in a scenario C in the specific embodiments, the foregoing neural network compression method can be used to compress a text recognition network. The text recognition network is used to recognize a category of input text. For example, the category may be obtained through classification based on a criterion such as an intention or a subject. In this case, the "initial sample generator" is an "initial text generator", the "to-be-compressed neural network" is the "initial text generator", the "first generated sample" is "generated text", the "real sample" is "real text", and the "determining result" is a "determined intention", the "real result" is a "real intention", and "the second generated sample" is "sample text".

According to a twelfth aspect, an embodiment of this application further provides a data processing method, including:

A terminal receives input data; inputs the input data into a compressed neural network, and processes the input data by using the compressed neural network, to obtain a processing result, where the compressed neural network is obtained by using the neural network compression method described in the eleventh aspect; and finally outputs the processing result.

It should be understood that content of the processing result depends on a function of the compressed neural network, and may be a classification result, a recognition result, or the like of the input data, where the function of the compressed neural network depends on a function of a to-be-compressed neural network. For example, the input data is a face image, and the to-be-compressed neural network is a facial attribute recognition network and is used to recognize an attribute of a person described in the input face image, for example, a gender, an age. In this case, the compressed neural network can recognize the gender, the age, or the like of the person described in the input image, and the processing result may include the gender, the age that is recognized in the input image.

It should be further understood that, compared with the to-be-compressed neural network, the compressed neural network has a simpler network structure and fewer parameters, and occupies a few storage resources during running. Therefore, the compressed neural network may be applied to a lightweight terminal.

According to a thirteenth aspect, an embodiment of this application further provides an image generator training apparatus. The apparatus includes modules configured to perform the method in the first aspect.

According to a fourteenth aspect, an embodiment of this application further provides an image generator training apparatus. The apparatus includes: a memory, configured to store a program; and a processor, configured to execute the program stored in the memory. When the program stored in the memory is executed, the processor is configured to perform the method in the first aspect.

According to a fifteenth aspect, an embodiment of this application further provides an image generation apparatus. The apparatus includes modules configured to perform the method in the second aspect.

According to a sixteenth aspect, an embodiment of this application further provides an image generation apparatus. The apparatus includes: a memory, configured to store a program; and a processor, configured to execute the program stored in the memory. When the program stored in the memory is executed, the processor is configured to perform the method in the second aspect.

According to a seventeenth aspect, an embodiment of this application further provides a neural network compression apparatus. The apparatus includes modules configured to perform the method in the third aspect.

According to an eighteenth aspect, an embodiment of this application further provides a neural network compression apparatus. The apparatus includes: a memory, configured to store a program; and a processor, configured to execute the program stored in the memory. When the program stored in the memory is executed, the processor is configured to perform the method in the third aspect.

According to a nineteenth aspect, an embodiment of this application further provides an image processing apparatus (or terminal), including modules configured to perform the method in the fourth aspect.

According to a twentieth aspect, an embodiment of this application further provides an image processing apparatus (or terminal), including: a memory, configured to store a program; and a processor, configured to execute the program stored in the memory. When the program stored in the memory is executed, the processor is configured to perform the method in the fourth aspect.

According to a twenty-first aspect, an embodiment of this application further provides a text generator training apparatus. The apparatus includes modules configured to perform the method in the fifth aspect.

According to a twenty-second aspect, a text generator training apparatus is provided. The apparatus includes: a memory, configured to store a program; and a processor, configured to execute the program stored in the memory. When the program stored in the memory is executed, the processor is configured to perform the method in the fifth aspect.

According to a twenty-third aspect, an embodiment of this application further provides a text generation apparatus. The apparatus includes modules configured to perform the method in the sixth aspect.

According to a twenty-fourth aspect, an embodiment of this application further provides a text generation apparatus. The apparatus includes: a memory, configured to store a program; and a processor, configured to execute the program stored in the memory. When the program stored in the memory is executed, the processor is configured to perform the method in the sixth aspect.

According to a twenty-fifth aspect, an embodiment of this application further provides a neural network compression apparatus. The apparatus includes modules configured to perform the method in the seventh aspect.

According to a twenty-sixth aspect, an embodiment of this application further provides a neural network compression apparatus. The apparatus includes: a memory, configured to store a program; and a processor, configured to execute the program stored in the memory. When the program stored in the memory is executed, the processor is configured to perform the method in the seventh aspect.

According to a twenty-seventh aspect, an embodiment of this application further provides a text processing apparatus (or terminal), including modules configured to perform the method in the eighth aspect.

According to a twenty-eighth aspect, an embodiment of this application further provides a text processing apparatus (or terminal), including: a memory, configured to store a program; and a processor, configured to execute the program stored in the memory. When the program stored in the memory is executed, the processor is configured to perform the method in the eighth aspect.

According to a twenty-ninth aspect, an embodiment of this application further provides a sample generator training apparatus. The apparatus includes modules configured to perform the method in the ninth aspect.

According to a thirtieth aspect, an embodiment of this application further provides a sample generator training apparatus. The apparatus includes: a memory, configured to store a program; and a processor, configured to execute the program stored in the memory. When the program stored in the memory is executed, the processor is configured to perform the method in the ninth aspect.

According to a thirty-first aspect, an embodiment of this application further provides a sample generation apparatus. The apparatus includes modules configured to perform the method in the tenth aspect.

According to a thirty-second aspect, an embodiment of this application further provides a sample generation apparatus. The apparatus includes: a memory, configured to store a program; and a processor, configured to execute the program stored in the memory. When the program stored in the memory is executed, the processor is configured to perform the method in the tenth aspect.

According to a thirty-third aspect, an embodiment of this application further provides a neural network compression apparatus. The apparatus includes modules configured to perform the method in the eleventh aspect.

According to a thirty-fourth aspect, an embodiment of this application further provides a neural network compression apparatus. The apparatus includes: a memory, configured to store a program; and a processor, configured to execute the program stored in the memory. When the program stored in the memory is executed, the processor is configured to perform the method in the eleventh aspect.

According to a thirty-fifth aspect, an embodiment of this application further provides a data processing apparatus (or terminal), including modules configured to perform the method in the twelfth aspect.

According to a thirty-sixth aspect, an embodiment of this application further provides a data processing apparatus (or terminal), including: a memory, configured to store a program; and a processor, configured to execute the program stored in the memory. When the program stored in the memory is executed, the processor is configured to perform the method in the twelfth aspect.

According to a thirty-seventh aspect, an embodiment of this application further provides a computer-readable medium. The computer-readable medium stores program code to be executed by a device, and the program code is used to perform the method described in any one of the first to the twelfth aspects.

According to a thirty-eighth aspect, an embodiment of this application provides a computer program product including an instruction. When the computer program product runs on a computer, the computer is enabled to perform the method described in any one of the first to the twelfth aspects.

According to a thirty-ninth aspect, an embodiment of this application further provides a chip. The chip includes a processor and a data interface, and the processor reads, through the data interface, an instruction stored in a memory, to perform the method described in any one of the first to the twelfth aspects.

Optionally, in an implementation, the chip may further include the memory. The memory stores the instruction. The processor is configured to execute the instruction stored in the memory. When the instruction is executed, the processor is configured to perform the method described in any one of the first to the twelfth aspects.

According to a fortieth aspect, an embodiment of this application further provides an electronic device. The electronic device includes the apparatus described in any one of the twenty-fifth to the thirty-seventh aspects.

BRIEF DESCRIPTION OF DRAWINGS

To describe the technical solutions in the embodiments of this application or in the background more clearly, the following briefly describes the accompanying drawings for describing the embodiments of this application or the background.

DESCRIPTION OF EMBODIMENTS

Figure 1:
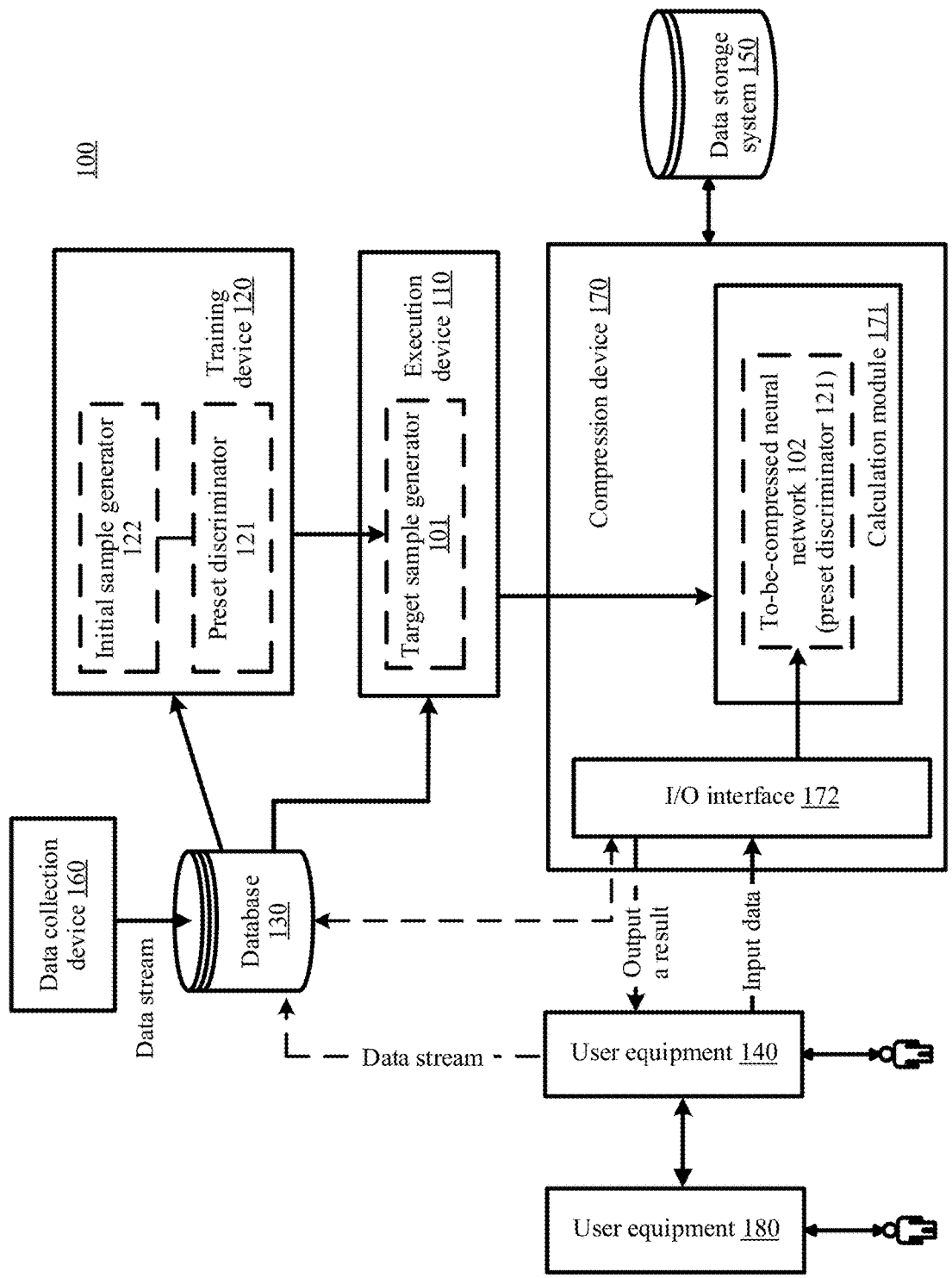
FIG. 1 is a schematic block diagram of a system architecture according to an embodiment of this application.

The following describes technical solutions of this application with reference to accompanying drawings.

An image generation method provided in the embodiments of this application may be applied to a scenario of training, compression, or the like of a neural network whose input is an image. Specifically, the image generation method in the embodiments of this application may be applied to the following scenario A and scenario B. The following briefly describes the scenario A and the scenario B separately.

Scenario A:

A customer obtains an image recognition network through training based on training data. The image recognition network may recognize a category of an input image. The image may be classified based on a type, a shape, or the like of an object described in the image, for example, an airplane, a car, a bird, a cat, a deer, a dog, a frog, a horse, a boat, or a truck. The training data of the image recognition network includes a real image and a category corresponding to the real image. The customer may request a service provider providing a neural network compression service, to compress the trained image recognition network. In a process of compressing the image recognition network, a compression device (for example, a cloud platform providing the neural network compression service) of the service provider needs to use the training data that is used to obtain the image recognition network through training. However, it is usually difficult for the customer to provide the training data of the image recognition network. In this case, to compress the image recognition network, the compression device needs to generate the training data.

In this case, an initial image generator may be constructed. The initial image generator is a deep neural network, and can process an input random vector to output a generated image. The generated image output by the initial image generator is input into the image recognition network, to obtain a determined category corresponding to the generated image, in other words, a probability that the generated image is predicted as each of the plurality of categories. It should be understood that, in an initial learning process of the initial image generator, the generated image differs greatly from a real image. Accuracy of determining the generated image by the image recognition network is low. In other words, there is a relatively small difference between probabilities that the generated image is recognized as the foregoing categories. A training device may determine a real category corresponding to the input random vector, and update parameters of the initial image generator based on a difference between the real category and the determined category. In this way, for a generated image output by an image generator obtained after parameter update, there is a smaller difference between a determined category recognized by the image recognition network and a real category, and a target image generator is finally obtained. It may be considered that a sample image that is output after the target image generator processes the input random vector may approximate the real image used for obtaining the image recognition network through training. Further, the compression device may compress and accelerate the image recognition network based on the generated sample image by using a distillation or pruning algorithm.

It can be learned that the target image generator obtained by using an image training method provided in the embodiments of this application does not need to use the training data of the image recognition network. The generated image is input into the trained image recognition network, to obtain the determined category of the generated image, and the target image generator is obtained through training based on the difference between the determined category and the real category of the generated image. In addition, the sample image generated by the target image generator may approximate the real image used for obtaining the image recognition network through training.

Scenario B:

A customer obtains a facial attribute recognition network through training based on training data. The facial attribute recognition network can recognize an attribute such as a gender, an age, or an emotion of a person described in an input face image. Different attributes belong to different categories, and the training data of the facial attribute recognition network includes a real face image and an attribute corresponding to the real face image. The customer may request a service provider providing a neural network compression service, to compress the trained facial attribute recognition network. This operation is similar to the operation performed for the foregoing image recognition network. In a process of compressing the facial attribute recognition network, a compression device (for example, a cloud platform providing the neural network compression service) of the service provider needs to use the training data that is used to obtain the facial attribute recognition network through training. However, it is usually difficult for the customer to provide the training data of the facial attribute recognition network. In this case, to compress the facial attribute recognition network, the compression device needs to generate the training data.

In this case, an initial face image generator may be constructed. The initial face image generator is a deep neural network, and can process an input random vector to output a generated face image. The generated face image output by the initial face image generator is input into the facial attribute recognition network, to obtain a determined attribute, in other words, a probability that the generated face image is predicted as each attribute in a plurality of attribute categories. It should be understood that, in an initial training process of the initial face image generator, the generated face image differs greatly from a real face image. Accuracy of determining the generated face image by the facial attribute recognition network is low. In other words, there is a relatively small difference between probabilities that the generated face image is recognized as attributes of all the categories. A training device may determine a real attribute corresponding to the generated face image that is obtained by the initial face image for the input random vector, and update parameters of the initial face image generator based on a difference between the real attribute and the determined attribute. In this way, for a generated face image output by a face image generator obtained after parameter update, there is a smaller difference between a determined attribute recognized by the facial attribute recognition network and a real attribute, and a target face image generator is finally obtained. It may be considered that a sample face image that is output after the target face image generator processes the input random vector may approximate the real face image used for obtaining the facial attribute recognition network through training. Further, the compression device may compress and accelerate the facial attribute recognition network based on the generated sample face image by using a distillation or pruning algorithm.

It can be learned that the target face image generator obtained by using the image generation method provided in the embodiments of this application does not need to use the real training data of the facial attribute recognition network. The generated face image is input into the trained facial attribute recognition network, to obtain the determined attribute of the generated face image, and the target face image generator is obtained through training based on the difference between the determined attribute and the real attribute of the generated face image. In addition, the sample face image obtained by the target face image generator may approximate the real face image used for obtaining the facial attribute recognition network through training.

Not limited to the foregoing scenario A and scenario B, the sample image generated by using the image generation method provided in the embodiments of this application may be further used as training data to be applied to another scenario of training a machine learning model that uses an image as an input. This is not limited in this application. It should be further understood that the face image is one type of image.

A text generation method provided in the embodiments of this application can be applied to a scenario of training, compression, or the like of a neural network whose input is text. Specifically, the text generation method in the embodiments of this application can be applied to the following scenario C. The following briefly describes the scenario C.

Scenario C:

Training data of the to-be-compressed neural network includes real text and a category corresponding to the real text. In this case, a text generation network may be obtained through training, to generate sample text that can replace the real text, and then the to-be-compressed neural network is compressed and accelerated based on the generated sample text by using a distillation or pruning algorithm.

A customer obtains a text recognition network through training based on training data, and the text recognition network can recognize a category of input text. In an application scenario, the text may be classified by intention. For example, intentions include turning on a light, turning off a light, turning on an air conditioner, turning off an air conditioner, turning on an acoustic device, and the like. The text recognition network may be applied to a smart home. After receiving a voice, a control center of the smart home converts the voice into text. Then, the control center recognizes, by using the text recognition network, an intention of the input text, and controls, according to the intention recognized by the text recognition network, a device in the smart home to execute an operation corresponding to the intention, for example, control the device to turn on an air conditioner. It should be understood that the intentions may be further classified in another manner. This is not limited in the embodiments of this application. It should be further understood that, in another application scenario, the text may be classified in another manner. For example, the text may be classified by subject, to manage the text by category. This is not limited in the embodiments of this application. The embodiments of this application are described by using an example in which the text recognition network is used to recognize the intention of the input text.

The training data of the text recognition network includes real text and a category corresponding to the real text. The customer may request a service provider providing a neural network compression service, to compress the trained text recognition network. In a process of compressing the text recognition network, a compression device (for example, a cloud platform providing the neural network compression service) of the service provider needs to use the training data that is used to obtain the text recognition network through training. However, the customer does not provide the training data of the text recognition network. In this case, to compress the text recognition network, the compression device needs to generate the training data.

In this case, an initial text generator may be constructed. The initial text generator is a deep neural network, and can process an input random vector to output generated text. The generated text output by the initial text generator is input into the text recognition network, to obtain a determined intention corresponding to the generated text, in other words, a probability that the generated text is predicted as each of the foregoing plurality of intentions. It should be understood that, in an initial training process of the initial text generator, the generated text differs greatly from the real text. Accuracy of determining the generated text by the text recognition network is low. In other words, there is a relatively small difference between probabilities that the generated text is recognized as the foregoing intentions. A training device may determine a real category corresponding to the input random vector, and update parameters of the initial text generator based on a difference between the real intention and the determined intention. In this way, for generated text output by a text generator obtained after parameter update, there is a smaller difference between a determined intention recognized by the text recognition network and a real intention, and a target text generator is finally obtained. It may be considered that sample text that is output after the target text generator processes the input random vector may approximate the real text used for obtaining the text recognition network through obtaining. Further, the compression device may compress and accelerate the text recognition network based on the generated sample text by using a distillation or pruning algorithm.

It can be learned that the target text generator obtained by using the text generation method provided in the embodiments of this application does not need to use the training data of the text recognition network. The generated text is input into the trained text recognition network, to obtain the determined intention of the generated text, and the target text generator is obtained through training based on the difference between the determined intention and the real intention of the generated text. In addition, the sample text obtained by the target text generator may approximate the real text used for obtaining the text recognition network through training.

The following describes, from a model training side and a model application side, the methods provided in this application.

A sample generator training method provided in the embodiments of this application relates to processing related to computer vision or processing related to a natural language, and may be specifically applied to data processing methods such as data training, machine learning, and deep learning, to perform symbolic and formal intelligent information modeling, extraction, preprocessing, training, and the like on training data (for example, a first matrix in this application), and finally obtain a trained target sample generator. In addition, the trained target sample generator may be applied to a sample generation method provided in the embodiments of this application, and input data (for example, a second matrix in this application) is input into the trained target sample generator, to obtain output data (for example, a second generated sample in this application). It should be noted that the target sample generator training method and the sample generation method provided in the embodiments of this application are applications generated based on a same concept, and may also be understood as two parts of a system, or two phases of an entire process, for example, a model training phase and a model application phase.

The embodiments of this application relate to mass application of a neural network. For ease of understanding, the following first describes related concepts such as a related term and the neural network in the embodiments of this application.

(1) Image Recognition

In the embodiments of this application, image recognition is to recognize a category, an attribute, or the like of an image by using related methods such as image processing, machine learning, and computer graphics. For example, in the scenario A, a category of an image is recognized. For another example, in the scenario B, an attribute of a face image is recognized.

(2) Text Recognition

In the embodiments of this application, text recognition is also referred to as natural language recognition, and is to recognize, by using related methods such as linguistics, computer science, and artificial intelligence, an intention, an emotion, another attribute, or the like expressed in text. For example, in the scenario C, an intention expressed in text is recognized.

(3) Neural Network

The neural network may include neurons. The neuron may be an operation unit that uses $x_s$ and an intercept of 1 as inputs, where an output of the operation unit may be as follows:

$$h_{W,b}(x)=f(W^T x)=f(\Sigma_{s=1}^{n} W_s x_s + b)$$

Herein, s=1, 2, ..., n, n is a natural number greater than 1, Ws is a weight of xs, and b is bias of the neuron. f is an activation function (activation functions) of the neuron, and the activation function is used to introduce a non-linear feature into the neural network, to convert an input signal in the neuron into an output signal. The output signal of the activation function may be used as an input of a next convolutional layer. The activation function may be a sigmoid function. The neural network is a network obtained by joining many single neurons together. To be specific, an output of a neuron may be an input of another neuron. An input of each neuron may be connected to a local receptive field of a previous layer to extract a feature of the local receptive field. The local receptive field may be a region including several neurons.

(4) Deep Neural Network

The deep neural network (deep neural network, DNN), also referred to as a multi-layer neural network, may be understood as a neural network having many hidden layers. The "many" herein does not have a special measurement criterion. Based on locations of different layers in the DNN, a neural network in the DNN may be divided into three types: an input layer, a hidden layer, and an output layer. Usually, the first layer is the input layer, the last layer is the output layer, and layers in the middle are all hidden layers. Layers are fully connected. To be specific, any neuron at the $i^{th}$ layer is definitely connected to any neuron at the $(i+1)^{th}$ layer. Although the DNN seems to be complex, the DNN is actually not complex in terms of work at each layer, and is simply expressed as the following linear relationship expression: $\vec{y}=\alpha(W\vec{x}+b)$, where $\vec{x}$ is an input vector, $\vec{y}$ is an output vector, b is a bias vector, W is a weight matrix (also referred to as a coefficient), and $\alpha(\ )$ is an activation function. At each layer, the output vector $\vec{y}$ is obtained by performing such a simple operation on the input vector $\vec{x}$. Because there are many layers in the DNN, there are also many coefficients W and bias vectors b. Definitions of these parameters in the DNN are as follows: The coefficient W is used as an example. It is assumed that in a three-layer DNN, a linear coefficient from the fourth neuron at the second layer to the second neuron at the third layer is defined as $W_{24}^3$. The superscript 3 represents a layer at which the coefficient W is located, and the subscript corresponds to an output third-layer index 2 and an input second-layer index 4. In conclusion, a coefficient from the $k^{th}$ neuron at the $(L-1)^{th}$ layer to the $j^{th}$ neuron at the $L^{th}$ layer is defined as $W_{jk}^L$. It should be noted that there is no parameter W at the input layer. In the deep neural network, more hidden layers make the network more capable of describing a complex case in the real world. Theoretically, a model with a larger quantity of parameters indicates higher complexity and a larger "capacity", and indicates that the model can complete a more complex learning task. Training the deep neural network is a process of learning a weight matrix, and a final objective of the training is to obtain weight matrices of all layers of a trained deep neural network (weight matrices formed by vectors W at many layers).

(5) Convolutional Neural Network

The convolutional neural network (CNN, convolutional neuron network) is a deep neural network with a convolutional structure. The convolutional neural network includes a feature extractor constituted by a convolutional layer and a sub sampling layer. The feature extractor may be considered as a filter. A convolution process may be considered as using a trainable filter to perform convolution on an input image or a convolutional feature plane (feature map). The convolutional layer is a neuron layer that is in the convolutional neural network and at which convolution processing is performed on an input signal. At the convolutional layer in the convolutional neural network, one neuron may be connected only to some adjacent-layer neurons. One convolutional layer usually includes several feature planes, and each feature plane may include some rectangularly-arranged neurons. Neurons in a same feature plane share a weight. The shared weight herein is a convolution kernel. Weight sharing may be understood as that an image information extraction manner is irrelevant to a location. A principle implied herein is that statistical information of a part of an image is the same as that of other parts. This means that image information learned in a part can also be used in another part. Therefore, same learned image information can be used for all locations in the image. At a same convolutional layer, a plurality of convolution kernels may be used to extract different image information. Usually, a larger quantity of convolution kernels indicates richer image information reflected by a convolution operation.

The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

(6) A recurrent neural network (RNN, recurrent neural networks) is used to process sequence data. In a conventional neural network model, a layer sequence is from an input layer to a hidden layer and then to an output layer, the layers are fully connected, and nodes at each layer are not connected. Such a common neural network resolves many problems, but is still incapable of resolving many other problems. For example, if a word in a sentence is to be predicted, a previous word usually needs to be used, because adjacent words in the sentence are not independent. A reason why the RNN is referred to as the recurrent neural network is that a current output of a sequence is also related to a previous output of the sequence. A specific representation form is that the network memorizes previous information and applies the previous information to calculation of a current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN. An error back propagation algorithm is used, but a difference between the RNN and the example conventional neural network is: If the RNN is expanded, a parameter such as W of the RNN is shared. In addition, during use of a gradient descent algorithm, an output in each step depends not only on a network in the current step, but also on a network status in several previous steps. The learning algorithm is referred to as a back propagation through time back propagation through time (BPTT) algorithm.

Now that there is a convolutional neural network, why is the recurrent neural network required? A reason is simple. In the convolutional neural network, it is assumed that elements are independent of each other, and an input and an output are also independent, such as a cat and a dog. However, in the real world, many elements are interconnected. For example, stocks change with time. For another example, a person says: I like travel, and my favorite place is Yunnan. I will go if there is a chance. Herein, people should know that the person will go to "Yunnan". A reason is that the people can deduce the answer based on content of the context. However, how can a machine do this? The RNN emerges. The RNN is intended to make the machine capable of memorizing like a human. Therefore, an output of the RNN needs to depend on current input information and historical memorized information.

(7) Loss Function

In a process of training a deep neural network, because it is expected that an output of the deep neural network maximally approximates a value that actually needs to be predicted, a current predicted value of the network and an actually desired target value may be compared, and then a weight vector of each neural network layer is updated based on a difference between the current predicted value and the target value (certainly, there is usually an process before the first update, to be specific, parameters are preconfigured for all layers of the deep neural network). For example, if the predicted value of the network is large, the weight vector is adjusted to lower the predicted value until the deep neural network can predict the actually desired target value or a value that more approximates the actually desired target value. Therefore, "how to obtain, through comparison, a difference between a predicted value and a target value" needs to be predefined. This is the loss function (loss function) or an objective function (objective function). The loss function and the objective function are important equations used to measure the difference between the predicted value and the target value. The loss function is used as an example. A higher output value (loss) of the loss function indicates a larger difference, and therefore training for the deep neural network is a process of minimizing the loss as much as possible.

For example, in this application, in a process of optimizing an initial sample generator, it is expected that a first generated sample output by the initial sample generator approximates a real sample as much as possible. Because a preset discriminator is a trained neural network, the preset discriminator can accurately recognize a category to which the real sample belongs. When the preset discriminator can accurately recognize a category to which the first generated sample belongs, it may be considered that the first generated sample has a feature similar to a feature of the real sample, in other words, the first generated sample approximates the real sample. Therefore, a determining result that is output by the preset discriminator for the first generated sample is compared with a real result that is actually desired, and then, a weight vector of each neural network layer in the initial sample generator is updated based on a difference between the determining result and the real result that is actually desired (certainly, there is usually an initialization process before the first update, to be specific, parameters are preconfigured for all layers in the initial sample generator). For example, if a value of the determining result output by the preset discriminator is high, the weight vector is adjusted to lower the value of the determining result until the preset discriminator can predict a value that more approximates the real result. Therefore, "how to obtain, through comparison, a difference between a determining result and a real result" needs to be predefined. This is the loss function (loss function) or the objective function (objective function). The loss function and the objective function are important equations used to measure the difference between the determining result and the real result. The loss function is used as an example. A higher output value (loss) of the loss function indicates a larger difference, and therefore training for the initial sample generator is a process of minimizing the loss as much as possible.

(8) Back Propagation Algorithm

A convolutional neural network may refine a value of a parameter in an initial sample generator in a training process by using an error back propagation (back propagation, BP) algorithm, so that a reconstruction error loss of the initial sample generator is smaller. Specifically, an input signal is transferred forward until an error loss occurs at an output, and the parameter in the initial sample generator is updated by using back propagation error loss information, to make the error loss converge. The back propagation algorithm is a back propagation motion dominated by an error loss, and is intended to obtain an optimal parameter, such as an optimal weight matrix, of a target sample generator.

(9) Generative Adversarial Network

The generative adversarial network (generative adversarial networks, GAN) is a deep learning model. The model includes at least two modules: a generative model (generative model, also referred to as a generative network in the embodiments of this application), and a discriminative model (discriminative model, also referred to as a discriminative network in the embodiments of this application). The two modules learn from each other through mutual gaming, to generate a better output. Both the generative model and the discriminative model may be neural networks, and may specifically be deep neural networks or convolutional neural networks. A basic principle of the GAN is as follows: A GAN for generating an image is used as an example. It is assumed that there are two networks: G (generator) and D (discriminator). G is a network for generating an image. G receives random noise z, and generates an image based on the noise, where the image is denoted as G(z). D is a discriminative network and used to determine whether an image is "real". An input parameter of D is x, x represents an image, and an output D (x) represents a probability that x is a real image. If a value of D (x) is 1, it represents that the image is 100% real. If the value of D (x) is 0, it represents that the image cannot be real. In a process of training the generative adversarial network, an objective of the generative network G is to generate an image that is as real as possible to deceive the discriminative network D, and an objective of the discriminative network D is to distinguish between the image generated by G and a real image as much as possible. In this way, a dynamic "gaming" process, to be specific, "adversary" in the "generative adversarial network", exists between G and D. A final gaming result is that in an ideal state, G may generate an image G(z) that is to be difficultly distinguished from a real image, and it is difficult for D to determine whether the image generated by G is real, to be specific, D(G(z))=0.5. In this way, an excellent generative model G is obtained, and can be used to generate an image.

(10) Pixel Value

A pixel value of an image may be a red green blue (RGB) color value, and the pixel value may be a long integer representing a color. For example, the pixel value is 256*Red+100*Green+76Blue, where Blue represents a blue component, Green represents a green component, and Red represents a red component. In each color component, a smaller value indicates lower brightness, and a larger value indicates higher brightness. For a grayscale image, a pixel value may be a grayscale value.

The following describes a system architecture provided in the embodiments of this application.

Referring to FIG. 1, an embodiment of the present application provides a system architecture 100. As shown in the system architecture 100, a data collection device 160 is configured to: collect or generate training data, and store the training data into a database 130. The training data in this embodiment of this application includes a first matrix, and the first matrix may be a stochastic matrix, a random vector, or the like. A training device 120 obtains a target sample generator 101 through training based on training data maintained in the database 130 and a preset discriminator 121. A training process may include: The training device 120 inputs the first matrix into an initial sample generator 122 to obtain a first generated sample, where the initial sample generator 122 is a deep neural network; inputs the first generated sample into the preset discriminator 121 to obtain a determining result, where the preset discriminator 121 is obtained through training based on first training data, and the first training data includes a real sample and a category corresponding to the real sample; and then determines a real result of the first generated sample based on the determining result, and updates the initial sample generator 122 based on a difference between the real result and the determining result of the first real sample, to obtain the target sample generator 101. The target sample generator 101 may be the target image generator in the scenario A, the target face image generator in the scenario B, or the target text generator in the scenario C. For detailed descriptions of obtaining, by the training device 120, the target sample generator 101 based on the training data, refer to related descriptions in the following Embodiment 1. Details are not described herein. The target sample generator 101 can be configured to implement the sample generation method provided in the embodiments of this application. To be specific, a second generated sample can be obtained by inputting a second matrix into the target sample generator 101. Specifically, refer to related descriptions in the following Embodiment 2. Details are not described herein. Further, the second generated sample can be used to implement a neural network compression method provided in the embodiments of this application. In this case, a to-be-compressed neural network 102 is the preset discriminator 121, and training data of the to-be-compressed neural network 102 (namely, the preset discriminator 121 in this application) is replaced with the second generated sample, to compress the to-be-compressed neural network 102 by using a distillation or pruning algorithm. Specifically, refer to related descriptions in the following Embodiment 3. Details are not described herein.

It should be understood that, in the scenario A in the embodiments of this application, the target sample generator 101 is the target image generator, the preset discriminator 121 and the to-be-compressed neural network 102 are both image recognition networks, and the second matrix is input into the target image generator to generate an image sample. The image sample may be further used to compress and accelerate the image recognition network. In the scenario B in the embodiments of this application, the target sample generator 101 is the target face image generator, the preset discriminator 121 and the to-be-compressed neural network 102 are both facial attribute recognition networks, and the second matrix is input into the target face image generator to generate a face image sample. The face image sample may be further used to compress and accelerate the facial attribute recognition network. In the scenario C in the embodiments of this application, the target sample generator 101 is the target text generator, the preset discriminator 121 and the to-be-compressed neural network 102 are both text recognition networks, and the second matrix is input into the target text generator to generate a text sample. The text sample may be further used to compress and accelerate the text recognition network.

In this embodiment provided in this application, the target sample generator is obtained by training the deep neural network. The preset discriminator in this embodiment of this application is a deep neural network model obtained through pre-training. It should be noted that, in actual application, the training data maintained in the database 130 is not necessarily all collected by the data collection device 160, and may be received from another device. In addition, it should be noted that the training device 120 does not necessarily perform training completely based on the training data maintained in the database 130, to obtain the target sample generator 101, and may obtain training data from a cloud or generate training data to perform model training. The foregoing description shall not be construed as a limitation on this embodiment of this application.

The target sample generator 101 obtained by the training device 120 through training may be applied to different systems or devices, for example, applied to an execution device 110 shown in FIG. 1. The execution device 110 may be a terminal, such as a mobile phone terminal, a tablet computer, a notebook computer, an AR/VR terminal, or a vehicle-mounted terminal, or may be a server, a cloud, or the like. The execution device 110 may perform the sample generation method, the image generation method, the text generation method, and the like in the embodiments of this application. In FIG. 1, an I/O interface 172 is configured for a compression device 170 and is configured to exchange data with an external device. A user may input data into the I/O interface 112 by using user equipment 140. In this embodiment of this application, the input data may include the to-be-compressed neural network 102. The user requests the compression device 170 to compress the to-be-compressed neural network 102.

In a related processing procedure in which a calculation module 171 of the compression device 170 performs calculation and the like, the compression device 170 may invoke data, code, and the like in a data storage system 150 to perform corresponding processing, and may also store, into the data storage system 150, data, an instruction, and the like that are obtained through corresponding processing.

Finally, the I/O interface 172 returns a processing result, for example, a compressed neural network obtained by using the foregoing neural network compression method, to the user equipment 140. The user equipment 140 may provide the processing result for user equipment 180. The user equipment 180 may be a lightweight terminal that needs to use the compressed neural network, for example, a mobile phone terminal, a notebook computer, an AR/VR terminal, or a vehicle-mounted terminal. The user equipment 180 is configured to respond to a corresponding requirement of a terminal user, for example, recognize an image input by the terminal user, and output a recognition result to the terminal user, or classify text input by the terminal user, and output a classification result to the terminal user.

It should be noted that the training device 120 may generate, based on different training data, corresponding target sample generators 101 for different objectives that are alternatively referred to as different tasks. The corresponding target sample generators 101 may be used to generate the foregoing samples or complete the foregoing tasks, to provide a required result for the user.

In a case shown in FIG. 1, the customer may manually provide the input data (for example, the to-be-compressed neural network in this embodiment of this application) by using a screen provided by the I/O interface 172. In another case, the user equipment 140 may automatically send the input data to the I/O interface 172. If it is required that the user equipment 140 need to obtain authorization from the user to automatically send the input data, the user may set corresponding permission on the user equipment 140. The customer may view, on the user equipment 140, a result output by the compression device 170.

After receiving the compressed neural network, the user equipment 140 may transmit the compressed neural network to the user equipment 180. The user equipment 180 may be a terminal, such as a mobile phone terminal, a tablet computer, a notebook computer, an AR/VR terminal, or a vehicle-mounted terminal. The user equipment 180 runs the compressed neural network to implement a function of the compressed neural network. It should be understood that the compression device 170 may alternatively provide the compressed neural network for the user equipment 180 directly. This is not limited.

It should be noted that FIG. 1 is merely a schematic diagram of a system architecture provided in an embodiment of the present application. A location relationship between a device, a component, a module, and the like shown in the figure constitutes no limitation. For example, in FIG. 1, the data storage system 150 is an external memory relative to the compression device 170. In another case, the data storage system 150 may alternatively be disposed in the compression device 170.

As shown in FIG. 1, the target sample generator 101 is obtained by the training device 120 through training. The target sample generator 101 may be the target image generator in the scenario A, the target face image generator in the scenario B, or the target text generator in the scenario C. Specifically, the target sample generator 101, the target image generator, the target face image generator, and the target text generator provided in the embodiments of this application each may be a machine learning model such as a convolutional neural network or a recurrent neural network.

The compressed neural network is obtained by the execution device 110 through compression. The compressed neural network may be a neural network obtained after the image recognition network is compressed in the scenario A, a neural network obtained after the facial attribute recognition network is compressed in the scenario B, a neural network obtained after the text recognition network is compressed in the scenario C, or the like. The neural network may be a machine learning model based on the deep neural network such as the convolutional neural network or the recurrent neural network.

As described in the foregoing basic concepts, the convolutional neural network is a deep neural network with a convolutional structure, and is a deep learning (deep learning) architecture. In the deep learning architecture, multilayer learning is performed at different abstract levels by using a machine learning algorithm. As the deep learning architecture, the CNN is a feed-forward (feed-forward) artificial neural network. Neurons in the feed-forward artificial neural network can respond to images input into the neurons.

Figure 2:
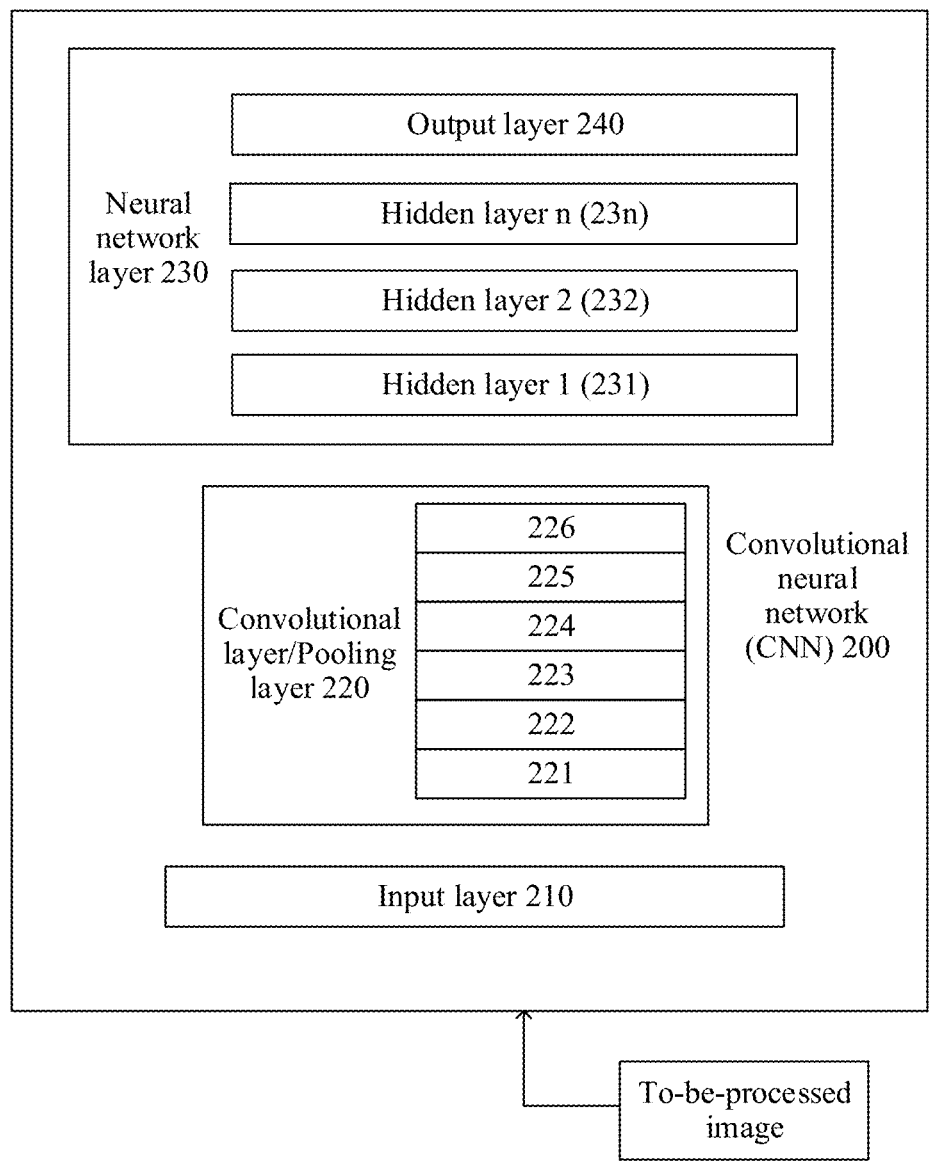
FIG. 2 is a schematic block diagram of a convolutional neural network according to an embodiment of this application.

As shown in FIG. 2, a convolutional neural network (CNN) 200 may include an input layer 210, a convolutional layer/pooling layer 220 (where the pooling layer is optional), and a neural network layer 230.

Convolutional Layer/Pooling Layer 220:

Convolutional Layer:

As shown in FIG. 2, the convolutional layer/pooling layer 220 may include layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. To be specific, an output of a convolutional layer may be used as an input of a subsequent pooling layer, or may be used as an input of another convolutional layer to continue to perform a convolution operation.

The following uses the convolutional layer 221 as an example to describe an internal working principle of one convolutional layer.

The convolutional layer 221 may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction on the input image, to extract a specific feature from the image. A size of the weight matrix needs to be related to a size of the image. It should be noted that a depth dimension (depth dimension) of the weight matrix is the same as that of the input image. In a convolution operation process, the weight matrix extends to the entire depth of the input image. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are stacked to form a depth dimension of a convolutional image. The dimension herein may be understood as being determined based on the foregoing "a plurality of". Different weight matrices may be used to extract different features from the image. For example, one weight matrix is used to extract edge information of the image, another weight matrix is used to extract a specific color of the image, and a further weight matrix is used to blur unneeded noise in the image. The plurality of weight matrices have the same size (rows×columns). Sizes of feature maps extracted by using the plurality of weight matrices with the same size are also the same, and then the plurality of extracted feature maps with the same size are combined to form an output of a convolution operation.

Weight values in these weight matrices need to be obtained through a lot of training in actual application. Each weight matrix formed by using the weight values obtained through training may be used to extract information from an input image, to enable the convolutional neural network 200 to perform correct prediction.

When the convolutional neural network 200 has a plurality of convolutional layers, a relatively large quantity of general features are usually extracted at an initial convolutional layer (for example, 221). The general feature may also be referred to as a low-level feature. As the depth of the convolutional neural network 200 increases, a feature extracted at a subsequent convolutional layer (for example, 226) becomes more complex, for example, a high-level semantic feature. A feature with higher semantics is more applicable to a to-be-resolved problem.

Pooling Layer:

A quantity of training parameters often needs to be reduced. Therefore, a pooling layer often needs to be periodically introduced after a convolutional layer. For the layers 221 to 226 shown in 220 in FIG. 2, one convolutional layer may be followed by one pooling layer, or a plurality of convolutional layers may be followed by one or more pooling layers. During image processing, the pooling layer is only used to reduce a space size of an image. The pooling layer may include an average pooling operator and/or a maximum pooling operator, to sample an input image to obtain a smaller image. The average pooling operator may be used to calculate pixel values in an image in a specific range, to generate an average value. The average value is used as an average pooling result. The maximum pooling operator may be used to select a pixel with a maximum value in a specific range as a maximum pooling result. In addition, similar to that a size of a weight matrix at the convolutional layer needs to be related to a size of an image, an operator at the pooling layer also needs to be related to a size of an image. A size of a processed image output from the pooling layer may be less than a size of an image input into the pooling layer. Each pixel in the image output from the pooling layer represents an average value or a maximum value of a corresponding sub-region of the image input into the pooling layer.

Neural Network Layer 230:

After processing performed at the convolutional layer/pooling layer 220, the convolutional neural network 200 is not ready to output required output information. As described above, at the convolutional layer/pooling layer 220, only a feature is extracted, and parameters resulting from an input image are reduced. However, to generate final output information (required class information or other related information), the convolutional neural network 200 needs to use the neural network layer 230 to generate an output of one required class or outputs of a group of required classes. Therefore, the neural network layer 230 may include a plurality of hidden layers (231, 232, . . . , and 23n shown in FIG. 2) and an output layer 240. Parameters included in the plurality of hidden layers may be obtained through pre-training based on related training data of a specific task type. For example, the task type may be image generation, text generation, or sample generation.

At the neural network layer 230, the plurality of hidden layers are followed by the output layer 240, namely, the last layer of the entire convolutional neural network 200. The output layer 240 has a loss function similar to a categorical cross entropy, and the loss function is specifically used to calculate a prediction error. Once forward propagation (propagation in a direction from 210 to 240, as shown in FIG. 2) of the entire convolutional neural network 200 is completed, reverse propagation (propagation in a direction from 240 to 210, as shown in FIG. 2) is started to update a weight value and a deviation of each layer mentioned above, to reduce a loss of the convolutional neural network 200 and an error between a result output by the convolutional neural network 200 by using the output layer and an ideal result.

It should be noted that the convolutional neural network 200 shown in FIG. 2 is merely an example convolutional neural network. In specific application, the convolutional neural network may alternatively exist in a form of another network model.

The following describes a hardware structure of a chip provided in the embodiments of this application.

Figure 3:
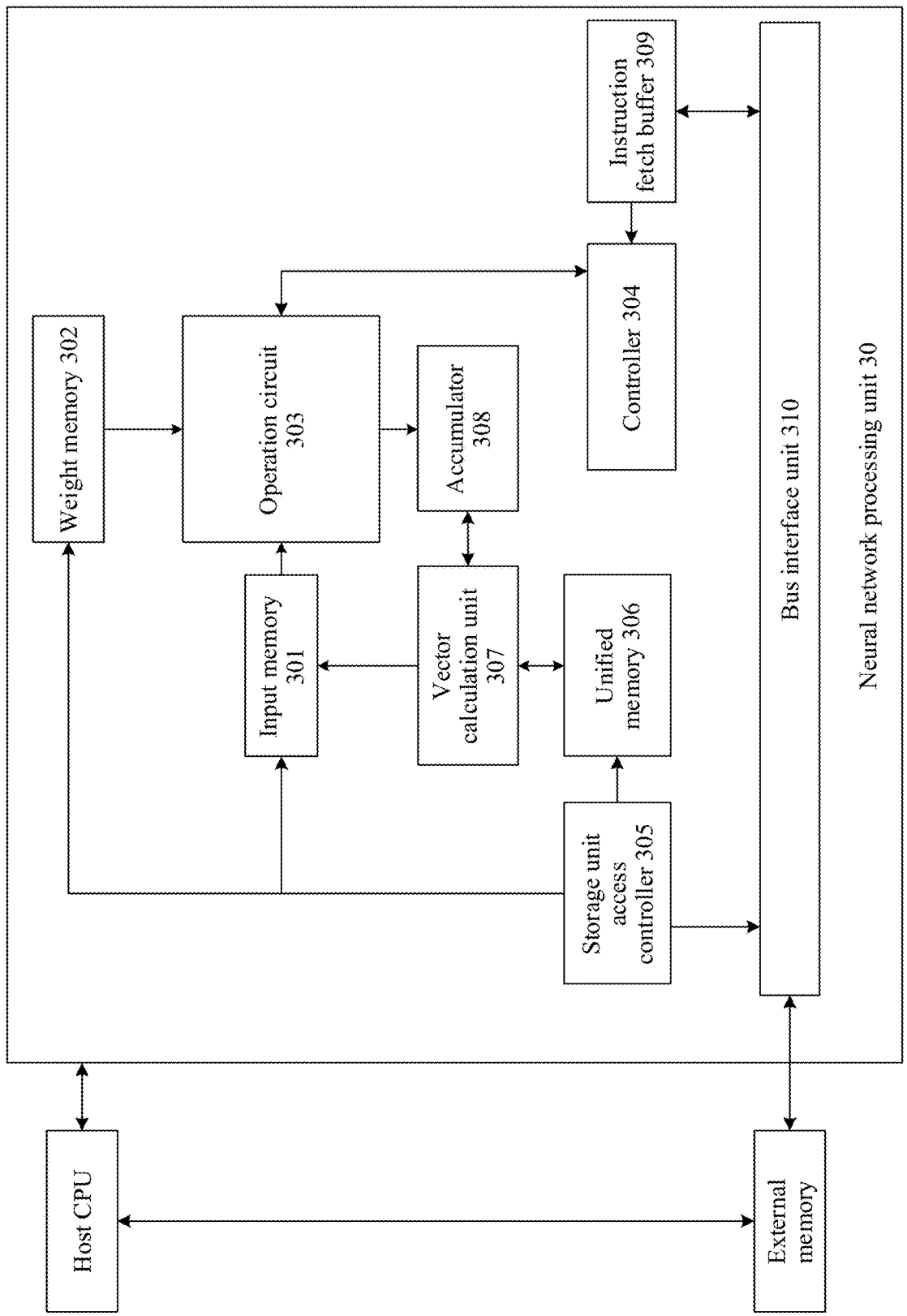
FIG. 3 is a schematic diagram of a hardware structure of a chip according to an embodiment of this application.

FIG. 3 shows a hardware structure of a chip according to an embodiment of the present application. The chip includes a neural network processing unit 30. The chip may be disposed in the execution device 110 shown in FIG. 1, to implement calculation work of the calculation module 171. The chip may alternatively be disposed in the training device 120 shown in FIG. 1, to complete training work of the training device 120 and output a target model/rule 101. All algorithms at the layers in the convolutional neural network shown in FIG. 2 may be implemented in the chip shown in FIG. 3.

The neural network processing unit 30 may be any processor, such as an NPU, a TPU, or a GPU, suitable for large-scale exclusive OR operation processing. The NPU is used as an example. The NPU may be mounted, as a coprocessor, onto a host CPU (Host CPU), and the host CPU allocates a task to the NPU. A core part of the NPU is an operation circuit 303. The operation circuit 303 is controlled by a controller 304 to extract matrix data from memories (301 and 302) and perform multiplication and addition.

In some implementations, the operation circuit 303 includes a plurality of process engines (Process Engine, PE). In some implementations, the operation circuit 303 is a two-dimensional systolic array. The operation circuit 303 may alternatively be a one-dimensional systolic array or another electronic circuit that can perform mathematical operations such as multiplication and addition. In some implementations, the operation circuit 303 is a general-purpose matrix processor.

For example, it is assumed that there is an input matrix A, a weight matrix B, and an output matrix C. The operation circuit 303 obtains weight data of the matrix B from the weight memory 302, and buffers the weight data on each PE in the operation circuit 303. The operation circuit 303 obtains input data of the matrix A from the input memory 301, performs a matrix operation based on the input data of the matrix A and the weight data of the matrix B, to obtain a partial result or a final result of the matrix, and stores the partial result or the final result into an accumulator (accumulator) 308.

A unified memory 306 is configured to store input data and output data. The weight data is directly transferred to the weight memory 302 by using a storage unit access controller (DMAC, Direct Memory Access Controller) 305. The input data is also transferred to the unified memory 306 by using the DMAC.

A bus interface unit (BIU, Bus Interface Unit) 310 is used for interaction between the DMAC and an instruction fetch buffer (Instruction Fetch Buffer) 309. The bus interface unit 301 is further used by the instruction fetch buffer 309 to obtain an instruction from an external memory. The bus interface unit 301 is further used by the storage unit access controller 305 to obtain original data of the input matrix A or the weight matrix B from the external memory.

The DMAC is mainly configured to transfer input data in an external memory DDR to the unified memory 306, or transfer the weight data to the weight memory 302, or transfer the input data to the input memory 301.

A vector calculation unit 307 includes a plurality of operation processing units, and if required, performs further processing such as vector multiplication, vector addition, an exponential operation, a logarithmic operation, or value comparison on an output of the operation circuit 303. The vector calculation unit 307 is mainly configured for calculation at a non-convolutional layer or a fully connected layer (FC, fully connected layers) of the neural network, and may specifically perform calculation in pooling (pooling), normalization (normalization), and the like. For example, the vector calculation unit 307 may apply a non-linear function to the output of the operation circuit 303, such as a vector of an accumulated value, to generate an active value. In some implementations, the vector calculation unit 307 generates a normalized value, a combined value, or both a normalized value and a combined value.

In some implementations, the vector calculation unit 307 stores a processed vector into the unified memory 306. In some implementations, a vector processed by the vector calculation unit 307 can be used as an active input of the operation circuit 303, for example, for use at a subsequent layer in the neural network. As shown in FIG. 2, if a current processing layer is a hidden layer 1 (231), the vector processed by the vector calculation unit 307 can also be used for calculation at a hidden layer 2 (232).

The instruction fetch buffer (instruction fetch buffer) 309 connected to the controller 304 is configured to store an instruction used by the controller 304.

The unified memory 306, the input memory 301, the weight memory 302, and the instruction fetch buffer 309 are all on-chip memories. The external memory is independent of a hardware architecture of the NPU.

Operations at the layers in the convolutional neural network shown in FIG. 2 may be performed by the operation circuit 303 or the vector calculation unit 307.

The following describes in detail the methods in the embodiments of this application.

It should be noted that the following Embodiment 1, Embodiment 2, Embodiment 3, Embodiment 4, and Embodiment 5 may be applied to the foregoing scenario A, scenario B, and scenario C. In an embodiment corresponding to the scenario A, the "initial sample generator" is an "initial image generator", the "preset discriminator" is an "image recognition network", the "first generated sample" is a "generated image", the "real sample" is a "real image", the "determining result" is a "determined category", the "real result" is a "real category", and the "second generated sample" is a "sample image".

In an embodiment corresponding to the scenario B, the "initial sample generator" is an "initial face image generator", the "preset discriminator" is an "initial face image generator", the "first generated sample" is a "generated face image", the "real sample" is a "real face image", the "determining result" is a "determined attribute", the "real result" is a "real attribute", and the "second generated sample" is a "sample face image".

In the scenario C, the "initial sample generator" is an "initial text generator", the "preset discriminator" is an "initial text generator", the "first generated sample" is "generated text", the "real sample" is "real text", the "determining result" is a "determined intention", the "real result" is a "real intention", and the "second generated sample" is "sample text".

Embodiment 1

Figure 4A:
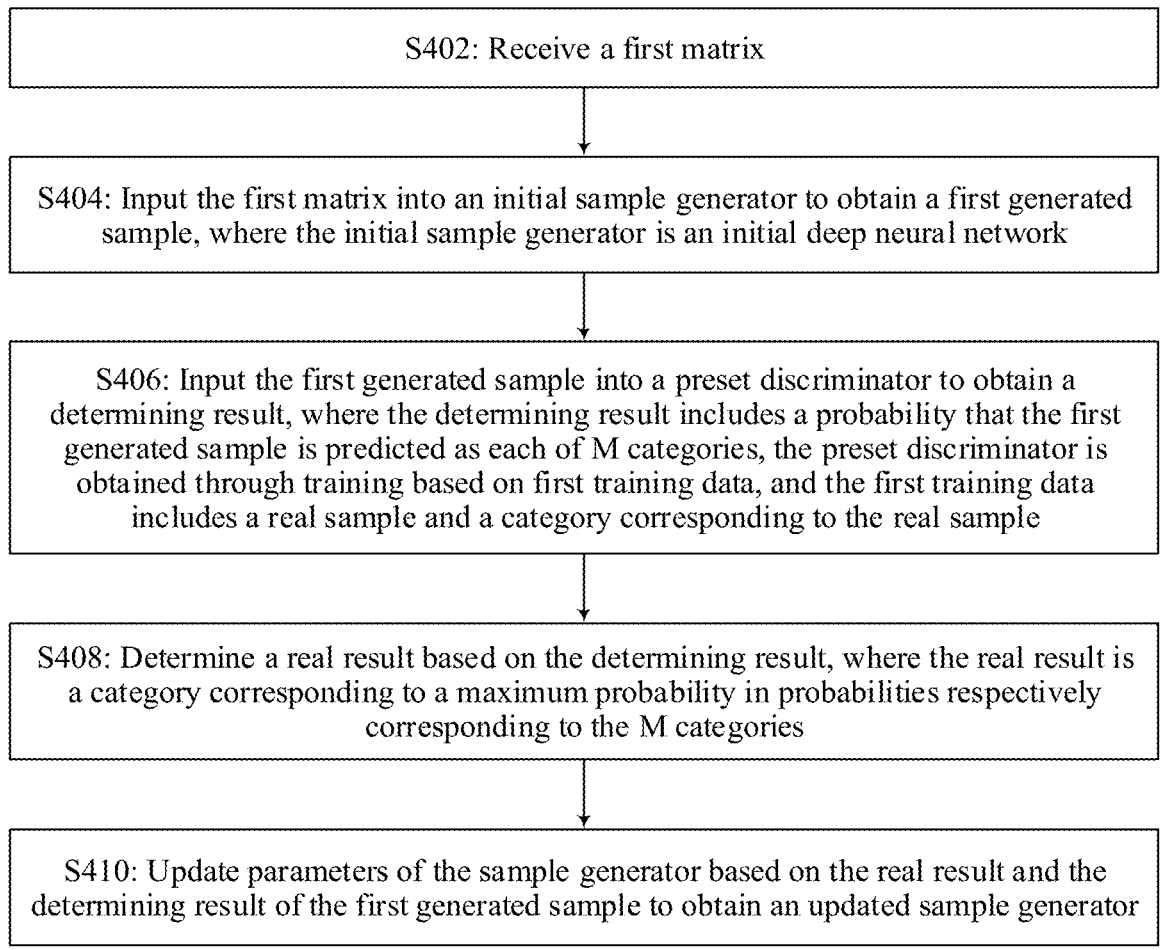
FIG. 4A is a schematic flowchart of a sample generator training method according to an embodiment of the present application.
Figure 4B:
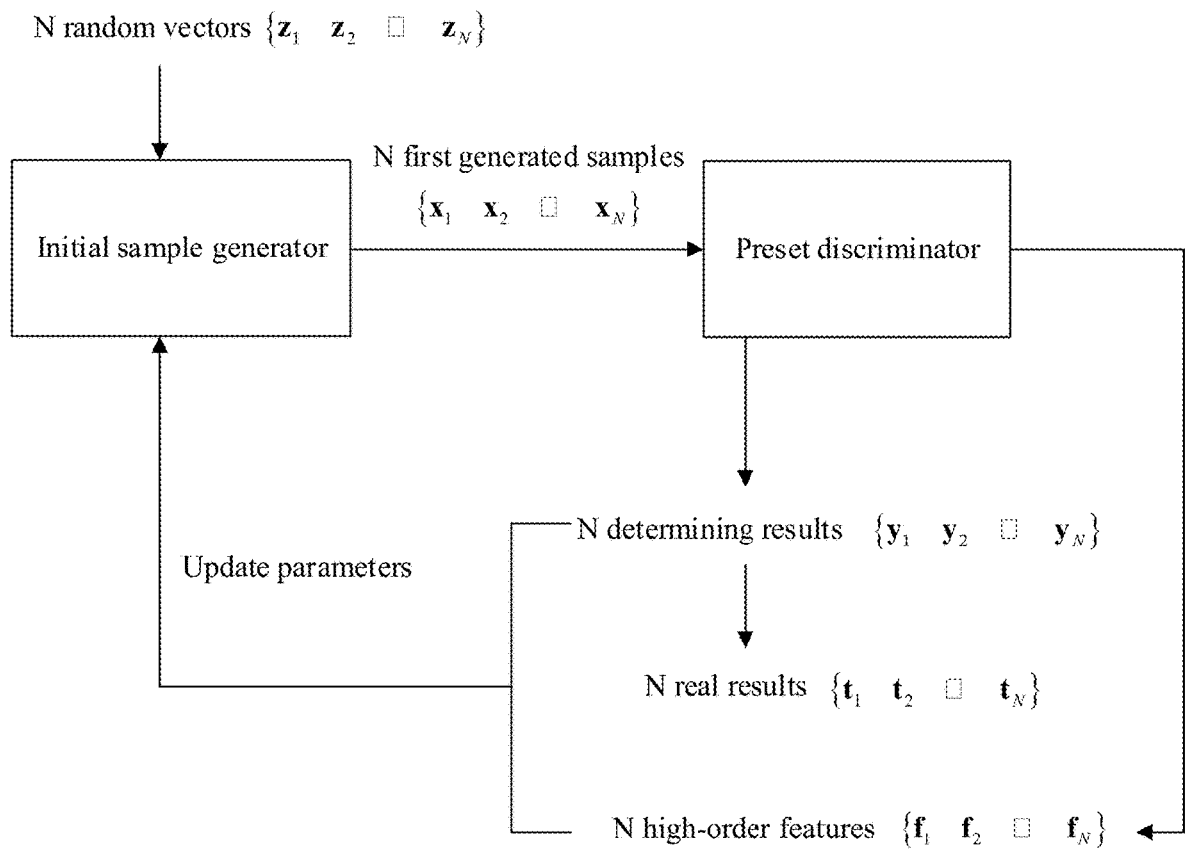
FIG. 4B is a schematic diagram illustrating a sample generator training method according to an embodiment of the present application.

FIG. 4A shows a sample generator training method according to Embodiment 1 of the present application. FIG. 4B is a schematic diagram illustrating the sample generator training method. The method may be specifically performed by the training device 120 shown in FIG. 1.

Optionally, the method may be performed by a CPU, may be jointly performed by a CPU and a GPU, or may be performed not by a GPU but by another processor suitable for neural network calculation, for example, the neural network processing unit 30 shown in FIG. 3. This is not limited in this application. The method may include some or all of the following steps.

S402: Receive a first matrix.

The first matrix may be a stochastic matrix (stochastic matrix), a random vector, or a matrix in another form. This is not limited in this application. The first matrix may be generated by the training device 120, may be pre-generated by another functional module before the training device 120, may be obtained from a database 130, or the like. This is not limited in this application.

The stochastic matrix is also referred to as a probability matrix, a markov matrix, or the like. Each element in the stochastic matrix is a non-negative real number representing a probability, and a sum of all elements in the stochastic matrix is 1.

It should be understood that, in this application, the training device may use a single sample, a plurality of samples, or all samples in one sample generator training process. This is not limited in this embodiment of this application. For example, if N samples are used in one training process, the training device receives N random vectors that may be represented as $\{z_1\ z_2\ L\ z_i\ L\ z_N\}$, where N is a positive integer, and the $i^{th}$ vector in the N random vectors is represented as $z_i$. i is an index of a random vector in the group of random vectors, and i is a positive integer not greater than N.

It should be understood that, in this embodiment of this application, the first matrix is a generic matrix, and values of elements in each of N first matrices may be different from each other. For example, $z_1 \neq z_2 \neq z_3 \ldots \neq z_N$.

S404: Input the first matrix into an initial sample generator to obtain a first generated sample, where the initial sample generator is a deep neural network.

It should be understood that the initial sample generator may be an initial deep neural network, or may be a deep neural network generated in a training process.

It should be further understood that the training device processes the input first matrix by using the initial sample generator, and the initial sample generator outputs a generated image. The first generated sample is a matrix including a plurality of pixel value points.

For example, the N random vectors $\{z_1\ z_2\ L\ z_i\ L\ z_N\}$ are separately input into the initial sample generator to obtain N first generated samples $\{x_1\ x_2\ L\ x_i\ L\ x_N\}$, where the random vectors one-to-one correspond to the first generated samples, in other words, the initial sample generator processes an input random vector $z_i$ to obtain a first generated sample $x_i$.

In this application, the "first generated sample" is a sample generated by the training device based on the input first matrix by using the initial sample generator. A "real sample" is a sample used for obtaining a preset discriminator through training.

S406: Input the first generated sample into the preset discriminator to obtain a determining result, where the determining result includes a probability that the first generated sample is predicted as each of M categories, the preset discriminator is obtained through training based on first training data, and the first training data includes the real sample and a category corresponding to the real sample.

It should be understood that, in this application, the preset discriminator is a deep neural network obtained through pre-training based on the first training data, and therefore the preset discriminator can recognize a category of an input sample. The preset discriminator is a known model, and a method for obtaining the preset discriminator through training is a method used for training a model in the prior art. This is not limited in this application.

The N first generated samples $\{x_1\ x_2\ L\ x_i\ L\ x_N\}$ are input into the preset discriminator to obtain N determining results $\{y_1\ y_2\ L\ y_i\ L\ y_N\}$, where the N first generated samples one-to-one correspond to the N determining results, in other words, the preset discriminator processes the input first generated sample $x_i$ to obtain a determining result $y_i$. In this application, the determining result includes the probability that the first generated sample is predicted as each of the M categories. In other words, the determining result is $y_i=\{y_{i1}\ y_{i,2}\ L\ y_{i,j}\ L\ y_{i,M}\}$, where $y_{i,j}$ indicates a probability that the generated sample $x_i$ is predicted as a category j, j is a category index, M is a positive integer greater than 1, and j is a positive integer not greater than M.

S408: Determine a maximum probability in probabilities corresponding to the M categories, and determine, as a real result of the first generated sample, a category corresponding to the maximum probability.

The real result $t_i$ corresponding to the first generated sample $x_i$ may be determined based on the determining result $y_i$ corresponding to the first generated sample $x_i$. In this case, the real result $t_i$ may be a category corresponding to a maximum probability value in the determining result $y_i$, that is, a probability corresponding to the category corresponding to the maximum probability value in the M categories is set to 1, and probabilities corresponding to other categories are all set to 0. N real results may be obtained based on the determining results of the N first generated samples. It should be understood that the determining results one-to-one correspond to the real results. The N real results may be represented as $\{t_1\ t_2\ L\ t_i\ L\ t_N\}$.

For example, the preset discriminator is the image recognition network shown in the scenario A, and the M categories include a dog, a cat, and a chicken. In this case, if a determining result of a generated image input into the image recognition network is: a probability corresponding to the dog is 0.5, a probability corresponding to the cat is 0.2, and a probability corresponding to the chicken is 0.3, the determining result may be represented as $\{0.5\ 0.2\ 0.3\}$. In this case, a real result of the generated image is the dog, and may be represented as $\{1\ 0\ 0\}$.

In another implementation of S408, any one of the M categories may alternatively be determined as the real result corresponding to the first generated sample. This is not limited in this embodiment of this application.

S410: Update parameters of the sample generator based on the real result and the determining result of the first generated sample to obtain an updated sample generator.

In the prior art, during training for a GAN network, a discriminator and a generator need to be iteratively trained, and the discriminator needs to be trained based on a real sample and a generated sample output by the generator. In this embodiment of this application, the preset discriminator is a trained deep neural network, and the real sample used for obtaining the preset discriminator through training cannot be obtained. In this application, the preset discriminator is used to recognize a category of a generated sample. When the first generated sample generated by the initial sample generator can be accurately recognized by the preset discriminator (in other words, when a difference between the determining result that is output by the preset discriminator for the first generated sample and the real result of the first generated sample approaches 0), it is considered that a generated sample obtained by the sample generator can replace the real sample used for obtaining the discriminator through training. In this embodiment of this application, during training for the sample generator, a back propagation algorithm may be used to refine values of the parameters of the sample generator in the training process, so that a reconstruction error loss of the sample generator is smaller.

In specific implementation of S410, the training device may determine, based on a difference between a determining result and a real result of each first generated sample, losses corresponding to the N first generated samples, and update, by using an optimization algorithm, the parameters of the sample generator based on the losses corresponding to the N first generated samples. In the training process, parameters of the preset discriminator remain unchanged, and only the parameters of the sample generator are updated. The optimization algorithm may be a gradient descent (gradient descent) algorithm or another optimization algorithm. This is not limited in this embodiment of this application.

In this embodiment of this application, the losses corresponding to the N first generated samples may be calculated by using a loss function. The loss function may include a first loss item determined based on a difference between a determining result and a real result. The first loss item may be a mean absolute error (mean absolute error, MAE), a mean squared error (mean squared error, MSE), a root mean squared error (root mean squared error, RMSE), or the like between the determining result and the real result, may be a cross entropy between the determining result and the real result, or may be in another form. This is not limited in this application.

For example, in this embodiment of this application, the first loss item $L_c$ may be represented by using a cross entropy. In this case, $$L_c = \frac{1}{N}\sum_i H_c(y_i, t_i) \quad (1)$$

Herein, $H_c(y_i, t_i)$ represents a cross entropy between a determining result $y_i$ and a real result $t_i$, and may be represented as:

$$H_c(y_i, t_i) = -\sum_j [y_{i,j} \log t_{i,j} + (1 - y_{i,j}) \log(1 - t_{i,j})] \quad (2)$$

The real sample is input into the deep neural network, and an absolute value of an extracted feature is usually relatively large. To enable the generated sample and the real sample to have similar features, optionally, the loss function may further include a second loss item determined based on a feature of the first generated sample. In this case, the sample generator training method further includes: The training device extracts the feature of the first generated sample by using the preset discriminator, where the feature of the first sample may be a feature that is output by any convolutional layer in the preset discriminator after the first generated sample is input into the preset discriminator. Optionally, the feature of the first generated sample is a feature output by the last convolutional layer in the preset discriminator, in other words, a high-order feature of the first generated sample. It should be understood that the high-order feature is a high-level semantic feature. For example, for text, the high-order feature may be a semantic feature or the like. A feature corresponding to the generated sample $x_i$ may be represented as $f_i$. N features $\{f_1\ f_2\ L\ f_i\ L\ f_N\}$ may be obtained from the N first generated samples. Herein, $f_i = \{f_{i,1}\ f_{i,2}\ L\ f_{i,k}\ L\ f_{i,P}\}$, and P is a positive integer.

The second loss item $L_f$ may be represented as follows:

$$L_f = -\frac{1}{N}\sum_i \|f_i\|_1 \quad (3)$$

Herein, $\|f_i\|_1$ represents a 1-norm of a matrix $f_i$, in other words, a sum of absolute values of all elements in the matrix $f_i$.

$$\|f_i\|_1 = \frac{1}{P}\sum_k |f_{i,k}| \quad (4)$$

It should be understood that the second loss item $L_f$ may alternatively be in another form. For example, the second loss item $L_f$ is an average value of 2-norms of the N features. This is not limited in this embodiment of this application.

It should be understood that, if probabilities that the sample generator generates first generated samples of all the categories are the same, for any one of the M categories, for example, a category i, a probability that the plurality of first generated samples are predicted as the category i approaches 1/M. In this case, an information entropy of the M categories is the largest. Optionally, the sample generator training method further includes: calculating an average probability value that the N first generated samples are predicted as each of the M categories, to obtain average probability values $V = \{v_1\ v_2\ L\ v_j\ L\ v_M\}$ of the M categories in the N determining results, where $v_j$ is an average probability value that the N first generated samples are predicted as the category j, and $v_j$ is:

$$v_j = \frac{1}{N}\sum_i y_{i,j} \quad (5)$$

For example, the preset discriminator is the image recognition network shown in the scenario A, M=3, the M categories include the dog, the cat, and the chicken, and N=4. In this case, if a determining result of a generated image F1 is $y_1 = \{0.5\ 0.2\ 0.3\}$ (namely, a probability corresponding to the dog is 0.5, a probability corresponding to the cat is 0.2, and a probability corresponding to the chicken is 0.3), a determining result of a generated image F2 is $y_2=\{0.3\ 0.4\ 0.3\}$, a determining result of a generated image F3 is $y_3=\{0.5\ 0.1\ 0.4\}$, and a determining result of a generated image F4 is $y_3=\{0.2\ 0.2\ 0.6\}$, an average probability value that the generated images are predicted as the dog is (0.6+0.3+0.5+0.2)/4=0.375. Similarly, an average probability value that the generated images are predicated as the cat is 0.225, and an average probability value that the generated images are predicated as the chicken is 0.4.

The loss function may further include a third loss item $L_{in}$ determined based on an average probability value of each of the M categories in the N determining results, and the third loss item $L_{in}$ may be represented as:

$$L_{in} = H_{in}(V) = \sum_{j=1}^{j=M} v_j \log v_j \quad (6)$$

It should be understood that the third loss item $L_{in}$ may alternatively be represented in another form. For example, the third loss item $L_{in}$ may be a mean absolute error, a mean squared error, a root mean squared error, or the like between an average probability value V and 1/M. This is not limited in this embodiment of this application.

First implementation of S410:

The training device may update the parameters of the sample generator based on the difference between the determining result and the real result of the first generated sample. In specific implementation, the training device may update model parameters of the initial sample generator by using the first loss item determined based on differences between the determining results and the real results of the N first generated samples. In this case, the loss function may be represented as:

$$L=L_c \quad (7)$$

Second Implementation of S410:

The training device may update the parameters of the initial image generator based on the feature of the first generated sample and the difference between the determining result and the real result of the first generated sample. In specific implementation, the training device may update model parameters of the initial sample generator by using the first loss item determined based on differences between the determining results and the real results of the N first generated samples and the second loss item determined based on the features of the N first generated samples. In this case, the loss function may be represented as:

$$L=L_c+\alpha L_f \quad (8)$$

Third Implementation of S410:

The training device may update the parameters of the initial image generator based on the difference between the determining result and the real result of the first generated sample, the feature of the first generated sample, and the average probability value of each of the M categories. In specific implementation, the training device may update model parameters of the initial sample generator by using the first loss item determined based on differences between the determining results and the real results of the N first generated samples, the second loss item determined based on the features of the N first generated samples, and the average probability value that is of each of the M categories and that is obtained by collecting statistics on the determining results of the N first generated samples. In this case, the loss function may be represented as:

$$L=L_c+\alpha L_f+\beta L_{in} \quad (9)$$

It should be understood that the preset discriminator in this embodiment of this application may be a neural network, a deep neural network, a convolutional neural network, a recurrent neural network, or the like. This is not limited in this embodiment of this application. For example, in the scenario A, the image recognition network may be a convolutional neural network. For another example, in the scenario B, the facial attribute recognition network may be a convolutional neural network. For another example, in the scenario C, the text recognition network may be a recurrent neural network.

Embodiment 2

A sample generation method in this embodiment of this application may be performed by an execution device 110. The execution device 110 has a target sample generator. Optionally, the method may alternatively be performed by a CPU, may be jointly performed by a CPU and a GPU, or may be performed not by a GPU but by another processor suitable for neural network calculation, for example, the neural network processing unit 30 shown in FIG. 3. This is not limited in this application.

The method includes: inputting a second matrix into the target sample generator to obtain a second generated sample.

The second matrix and a first matrix have same formats and same types, namely, same orders. A matrix type may be a stochastic matrix, a random vector, or the like. The target sample generator is obtained through training according to the foregoing Embodiment 1. For a specific training method, refer to related descriptions in the foregoing Embodiment 1. Details are not described herein again.

It should be understood that a first generated sample is a generated sample generated by an initial sample generator, and there is a relatively large difference between an attribute of the first generated sample and an attribute of a real sample. However, the second generated sample is a generated sample generated by the target sample generator. The target sample generator is a trained model, and has learned the attribute of the real sample. Therefore, an attribute of the second generated sample approximates the real sample, and may replace a real sample of a preset discriminator.

It should be understood that the second generated sample may be used to replace the real sample to train and compress a neural network model. For example, a compression device may obtain the second generated sample, where the second generated sample is generated by using the sample generation method described in the foregoing Embodiment 2. In this case, the preset discriminator is a to-be-compressed neural network. The compression device inputs the second generated sample into the to-be-compressed neural network to obtain a category corresponding to the second generated sample; and further compresses the to-be-compressed neural network based on the second generated sample and the category corresponding to the second generated sample. Specifically, refer to related descriptions in the following Embodiment 3 and Embodiment 4.

Embodiment 3

Figure 5A:
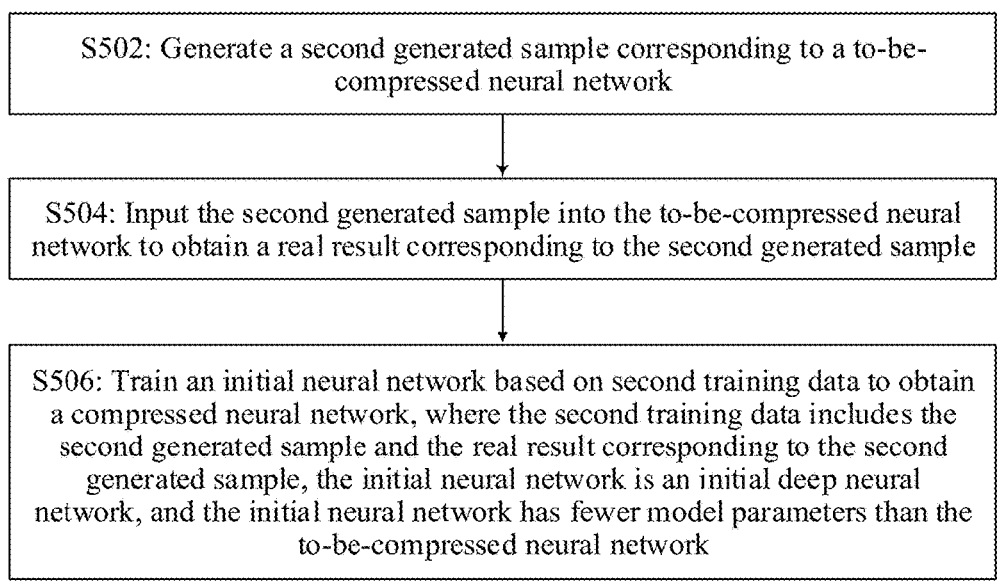
FIG. 5A is a schematic flowchart of a neural network compression method according to an embodiment of the present application.
Figure 5B:
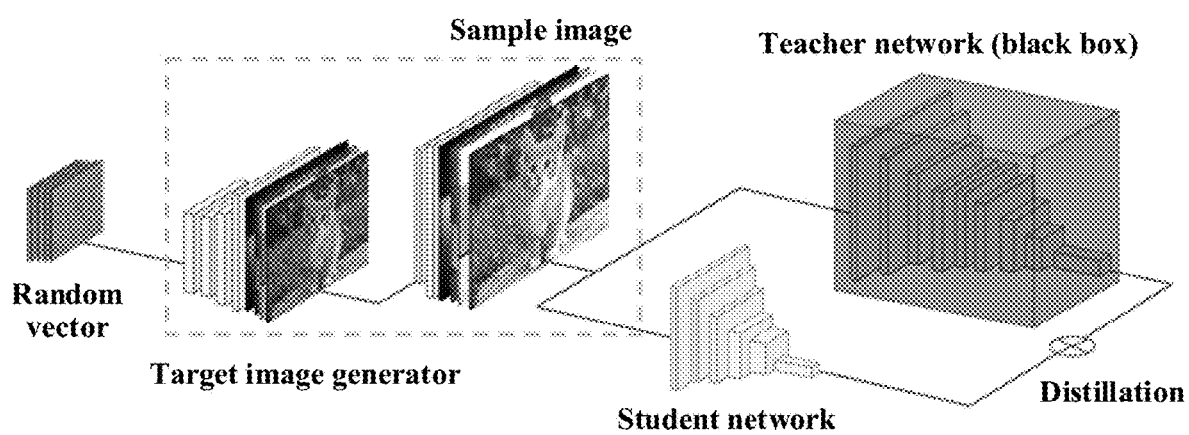
FIG. 5B is a schematic diagram of a principle of a neural network compression method according to an embodiment of the present application.

In this embodiment of this application, a to-be-compressed neural network is a black box, and provides only input and output interfaces. Both a structure and parameters of the to-be-compressed neural network are unknown. A real sample for training the to-be-compressed neural network cannot be obtained. In addition, in this embodiment of this application, a second generated sample generated by a target sample generator is unlabeled. With reference to a neural network compression method shown in FIG. 5A and a schematic diagram of a principle of a neural network compression method in FIG. 5B, the following describes how to compress the to-be-compressed neural network by using the unlabeled second generated sample and by using a distillation algorithm. In FIG. 5B, an example in which a sample generator is the target image generator in the scenario A is used for description. In this embodiment of this application, the neural network compression method may be performed by a compression device 170. Optionally, the method may alternatively be performed by a CPU, may be jointly performed by a CPU and a GPU, or may be performed not by a GPU but by another processor suitable for neural network calculation, for example, the neural network processing unit 30 shown in FIG. 3. This is not limited in this application.

The method may include but is not limited to the following steps.

S502: Obtain the second generated sample.

In this embodiment of this application, the to-be-compressed neural network is the preset discriminator in the foregoing Embodiment 1 and Embodiment 2, and the target sample generator applicable to the to-be-compressed neural network is obtained through training by using the method described in the foregoing Embodiment 1. In this way, the second generated sample output by the target sample generator has a feature similar to a feature of a training sample of the to-be-compressed neural network. In addition, the second generated sample of the to-be-compressed neural network may be generated by using the method described in the foregoing Embodiment 2. For a method for obtaining, through training, the target sample generator applicable to the to-be-compressed neural network, refer to related descriptions in the foregoing Embodiment 1. For a method for generating the second generated sample, refer to related descriptions in the foregoing Embodiment 2. Details are not described herein again.

Specifically, N second matrices $\{z'_1\ z'_2\ L\ z'_i\ L\ z'_N\}$ are input into the target sample generator applicable to the to-be-compressed neural network, to obtain N second generated samples $\{x'_1\ x'_2\ L\ x'_i\ L\ x'_N\}$.

S502: Input the second generated sample into the to-be-compressed neural network to obtain a real result corresponding to the second generated sample.

The N second generated samples are input into the to-be-compressed neural network to obtain real results $\{y'_1\ y'_2\ L\ y'_i\ L\ y'_N\}$ respectively corresponding to the N second generated samples.

The real result may be a category corresponding to a maximum probability in probabilities respectively corresponding to M categories, that is, a probability that the second generated sample is recognized as the category corresponding to the maximum probability is 1, and probabilities that the second generated sample is recognized as other categories are all 0. In this embodiment of this application, alternatively, probabilities respectively corresponding to the M categories and obtained by the to-be-compressed network by processing the second generated samples may be directly used as the real results.

It should be understood that the second generated sample has a feature similar to a feature of a real sample used for training the to-be-compressed neural network, and is a reliable sample. In addition, the to-be-compressed neural network is a trained neural network, and the to-be-compressed neural network may obtain a reliable output for an input reliable sample (the second generated sample). In other words, an output obtained by the to-be-compressed neural network by processing the second generated sample is the real result corresponding to the second generated sample, and may be used as a label of the second generated sample.

S506: Train an initial neural network based on second training data, to obtain a compressed neural network, where the second training data includes the second generated sample and the real result corresponding to the second generated sample, the initial neural network is a deep neural network, and the initial neural network has fewer model parameters than the to-be-compressed neural network.

It should be understood that, in this embodiment of this application, the to-be-compressed neural network is compressed by using the distillation algorithm. In this case, a neural network, namely, the initial neural network, is constructed. Compared with the to-be-compressed neural network, the initial neural network has a simpler structure and less parameter model data. The initial neural network is used as a student network, and the to-be-compressed neural network is used as a teacher network. The original complex to-be-compressed neural network is compressed into the low-complexity student network by using a teacher-student learning policy. Without greatly affecting accuracy, the low-complexity student network can have high calculation efficiency and low storage overheads.

Methods for constructing the initial neural network, determining a hyperparameter of the initial neural network, obtaining the compressed neural network through training based on the second training data, and the like belong to the prior art. This is not limited.

For example, in a specific implementation of S506, the N second generated samples are input into the initial neural network to obtain prediction results $\{y_1^s\ y_2^s\ L\ y_i^s\ L\ y_N^s\}$ respectively corresponding to the N second generated samples. The compression device may determine, based on a difference between a prediction result and a real result of each second generated sample, losses corresponding to the N second generated samples, and update, by using an optimization algorithm, parameters of the initial neural network based on the losses corresponding to the N second generated samples. A loss function L1 is used to calculate the losses corresponding to the N second generated samples. The loss function L1 may be a mean absolute error, a mean squared error, a root mean squared error, or the like between a prediction result and a real result, may be a cross entropy between a prediction result and a real result, or may be in another form. This is not limited in this application. For example, the loss function L1 may be represented as:

$$L1 = \frac{1}{N}\sum_i H_c(y_i^s, y_i') \qquad (10)$$

Herein, $H_c(y_i^s, y_i')$ represents a cross entropy between a prediction result $y_i^s$ and a real result $y_i'$, and may be represented as:

$$H_c(y_i^s, y_i') = -\sum_j [y_{i,j}^s \log y_{i,j}' + (1 - y_{i,j}^s)\log(1 - y_{i,j}')] \qquad (11)$$

Herein, a prediction result of a second generated sample $x_i'$ is $y_i' = \{y_{i,1}' \ y_{i,2}' \ L \ y_{i,j}' \ L \ y_{i,M}'\}$, and a real result of the second generated sample $x_i'$ is $y_i^s = \{y_{i,1}^s \ y_{i,2}^s \ L \ y_{i,j}^s \ L \ y_{i,M}^s\}$; where $y_{i,j}'$ represents a probability that the second generated sample $x_i'$ is predicted as a category j by the to-be-compressed neural network, $y_{i,j}^s$ represents a probability that the second generated sample $x_i'$ is predicted as the category j by the initial neural network, j is a category index, and M is a positive integer greater than 1, and j is a positive integer not greater than M.

It should be understood that L1 may alternatively be in another form. This is not limited in this embodiment of this application.

It can be learned that, in this embodiment of this application, the second generated sample that has the feature similar to the feature of the real sample used for training the to-be-compressed neural network is generated by using the target sample generator, and a result obtained by predicting the second generated sample by using the to-be-compressed neural network is used as the label. A neural network whose function is the same as a function of the to-be-compressed neural network is obtained by training a low-complexity neural network based on the second generated sample and the label of the second generated sample. The neural network is the compressed neural network. In this way, the to-be-compressed neural network is compressed when there is no training sample. The compressed neural network may be applied to a lightweight device such as a terminal, to reduce an operation loss, reduce storage overheads, and improve operation efficiency.

Embodiment 4

Figure 6:
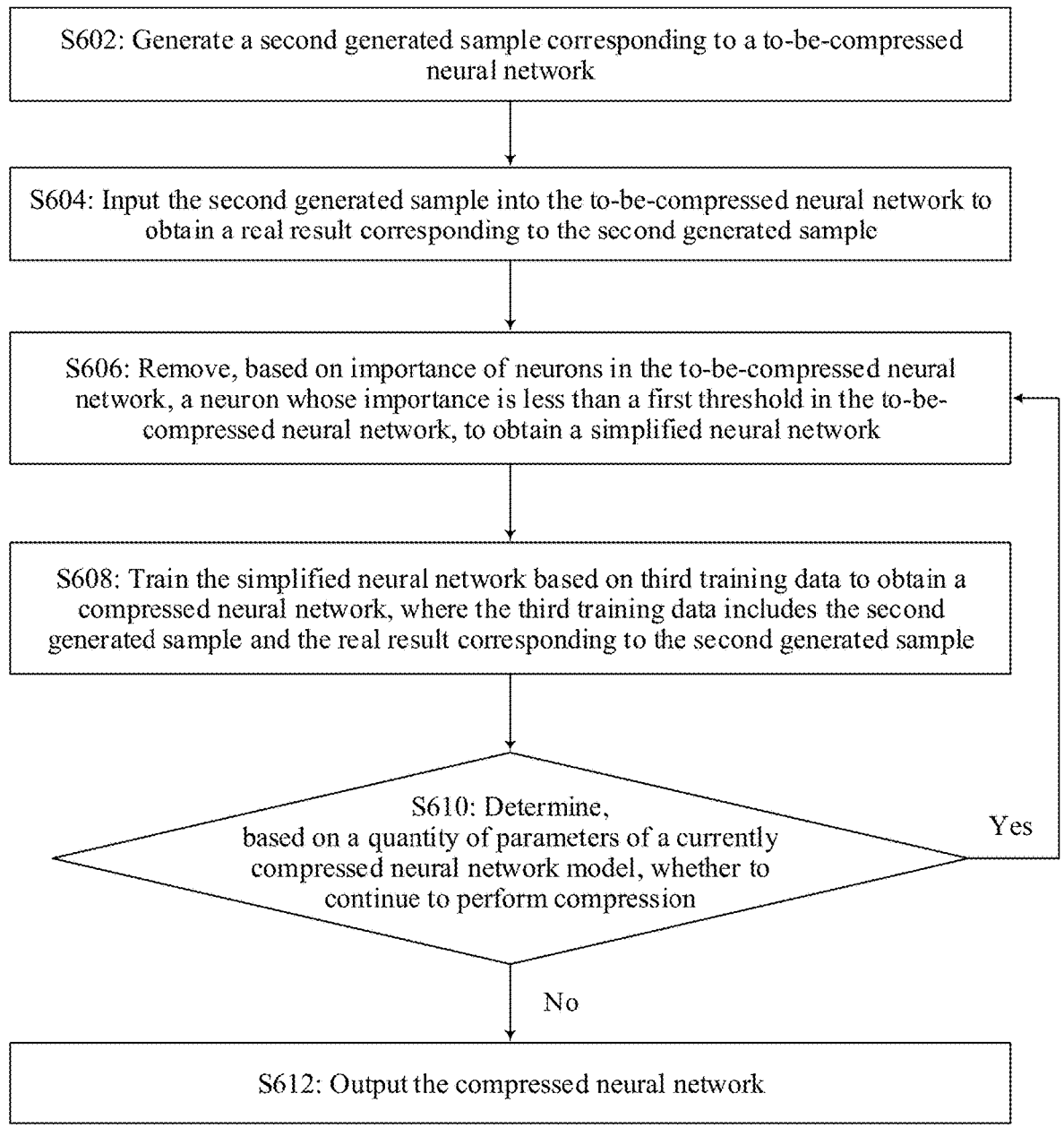
FIG. 6 is a schematic flowchart of another neural network compression method according to an embodiment of the present application.

In this embodiment of this application, a specific structure of a to-be-compressed neural network is known, but a real sample for training the to-be-compressed neural network cannot be obtained. In addition, in this embodiment of this application, a second generated sample generated by a target sample generator is unlabeled. According to a neural network compression method shown in FIG. 6, a redundant connection in the to-be-compressed neural network is removed by using a pruning algorithm, to obtain a simplified neural network, the second generated sample is labeled by using the to-be-compressed neural network, and the simplified neural network is trained by using the second generated sample as training data, to obtain a compressed neural network. This reduces complexity of the to-be-compressed neural network, improves operation efficiency, and reduces storage overheads. The method may be performed by a compression device 170. Optionally, the method may be performed by a CPU, may be jointly performed by a CPU and a GPU, or may be performed not by a GPU but by another processor suitable for neural network calculation, for example, the neural network processing unit 30 shown in FIG. 3. This is not limited in this application.

The neural network compression method may include some or all of the following steps.

S602: Obtain the second generated sample.

Specifically, refer to related descriptions in S502 in the foregoing Embodiment 3. Details are not described again in this embodiment of this application.

S604: Input the second generated sample into the to-be-compressed neural network to obtain a real result corresponding to the second generated sample.

Specifically, refer to related descriptions in S504 in the foregoing Embodiment 3. Details are not described again in this embodiment of this application.

S606: Remove, based on importance of neurons in the to-be-compressed neural network, a neuron whose importance is less than a first threshold in the to-be-compressed neural network, to obtain the simplified neural network.

Parameters of a neural network include a weight parameter of each convolutional layer. It should be understood that a larger absolute value of a weight indicates a larger contribution of a neuron corresponding to the weight parameter to an output of the neural network, and further indicates higher importance of the neuron to the neural network.

Based on this idea, in a specific implementation of S606, the compression device prunes some or all convolutional layers in the to-be-compressed neural network, to be specific, removes a neuron corresponding to a weight parameter whose absolute value is less than the first threshold at each convolutional layer, to obtain the simplified neural network.

In another implementation of this embodiment of this application, the compression device may sort the neurons in the to-be-compressed neural network based on the importance, and remove a plurality of neurons with lower importance from the to-be-compressed neural network, to obtain the simplified neural network.

It should be noted that, in this embodiment of this application, the importance refers to a contribution of a neuron to an output result, and a neuron that makes a great contribution to the output result is more important.

S608: Train the simplified neural network based on third training data, to obtain the compressed neural network, where the third training data includes the second generated sample and the real result corresponding to the second generated sample.

It should be understood that, compared with the to-be-compressed neural network, the simplified neural network has fewer parameters and a simpler network structure.

A method for obtaining the compressed neural network through training based on the third training data belongs to the prior art. This is not limited.

For example, in a specific implementation of S608, N second generated samples are input into the simplified neural network to obtain prediction results $\{y_1^h \ y_2^h \ L \ y_i^h \ L \ y_N^h\}$ respectively corresponding to the N second generated samples. The compression device may determine, based on a difference between a prediction result and a real result of each second generated sample, losses corresponding to the N second generated samples, and update, by using an optimization algorithm, parameters of the simplified neural network based on the losses corresponding to the N second generated samples. A loss function L2 is used to calculate the losses corresponding to the N second generated samples. The loss function L2 may be a mean absolute error, a mean squared error, a root mean squared error, or the like between a prediction result and a real result, may be a cross entropy between a prediction result and a real result, or may be in another form. This is not limited in this application. For example, the loss function L2 may be represented as:

$$L2 = \frac{1}{N} \sum_i H_c(y_i^h, y_i') \quad (12)$$

Herein, $H_c(y_i^h, y_i')$ represents a cross entropy between a prediction result $y_i^h$ and a real result $y_i'$, and may be represented as:

$$H_c(y_i^h, y_i') = -\sum_j [y_{i,j}^h \log y_{i,j}' + (1 - y_{i,j}^h) \log(1 - y_{i,j}')] \quad (13)$$

Herein, a prediction result of a second generated sample $x_i'$ is $y_i' = \{y_{i,1}' \ y_{i,2}' \ L \ y_{i,j}' \ L \ y_{i,M}'\}$, and a real result of the second generated sample $x_i'$ is $y_i^h = \{y_{i,1}^h \ y_{i,2}^h \ L \ y_{i,j}^h \ L \ y_{i,M}^h\}$, where $y_{i,j}'$ represents a probability that the second generated sample $x_i'$ is predicted as a category j by the to-be-compressed neural network, $y_{i,j}^h$ represents a probability that the second generated sample $x_i'$ is predicted as the category j by an initial neural network, j is a category index, and M is a positive integer greater than 1, and j is a positive integer not greater than M.

It should be understood that L2 may alternatively be in another form. This is not limited in this embodiment of this application.

Optionally, the method may further include the following step:

S610: Determine, based on a quantity of parameters of a currently compressed neural network model, whether to continue to perform compression.

Optionally, the compression device may alternatively determine comprehensively, based on a quantity of parameters and model accuracy that are of the currently obtained compressed neural network, whether to continue to perform compression. If the compression device determines to continue to perform compression, the compression device may further compress the to-be-compressed neural network by using the method described in the foregoing steps S606 and S608. If the compression device determines not to continue to perform compression, the compression device performs step S612, that is, outputs the compressed neural network.

It can be learned that, in this embodiment of this application, the second generated sample that has a feature similar to a feature of the real sample used for training the to-be-compressed neural network is generated by using the target sample generator, a result obtained by predicting the second generated sample by using the to-be-compressed neural network is used as a label, and the redundant connection in the to-be-compressed neural network is removed by using the pruning algorithm, to obtain the simplified neural network. The second generated sample is used as an input of the simplified neural network, the real result obtained by processing the input second generated sample by the to-be-compressed neural network is used as the label, and the simplified neural network is trained by using the second generated sample and the label of the second generated sample, to obtain the compressed neural network. In this way, the to-be-compressed neural network is compressed when there is no training sample. The compressed neural network may be applied to a lightweight device such as a terminal, to reduce the complexity of the to-be-compressed neural network, improve the operation efficiency, and reduce the storage overheads.

It may be understood that Embodiment 1 is a training phase (a phase performed by the training device 120 shown in FIG. 1) of the target sample generator, and specific training is performed by using the sample generator provided in any one of Embodiment 1 or possible implementations of Embodiment 1. Embodiment 2 may be understood as an application phase (a phase performed by the execution device 110 shown in FIG. 1) of the target sample generator. Specifically, the target sample generator obtained through training in Embodiment 1 is used, and the output second generated sample is obtained based on the input second matrix, in other words, the sample image in the scenario A, the sample face image in the scenario B, or the sample text in the scenario C. Embodiment 3 and Embodiment 4 may be understood as an application phase (a phase performed by the compression device 170 shown in FIG. 1) of the second generated sample, and the compression device 170 may compress the preset discriminator based on the second generated sample, to obtain a compressed model, namely, a compressed preset discriminator.

Embodiment 5

Figure 7:
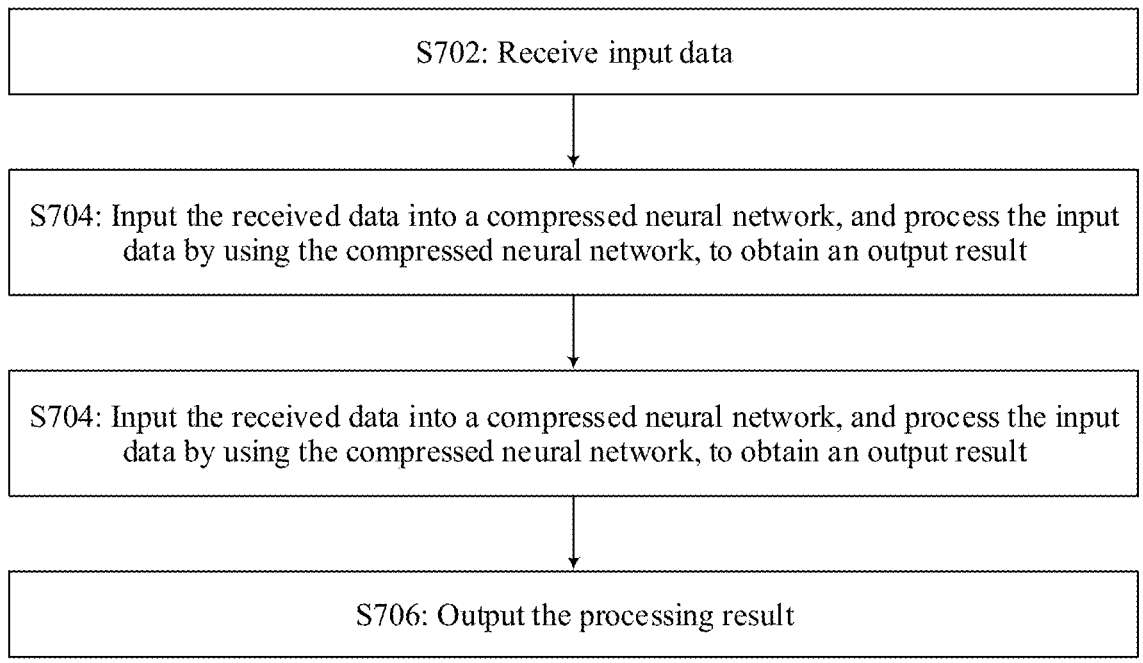
FIG. 7 is a schematic flowchart of a data processing method according to an embodiment of the present application.

After obtaining a compressed neural network, a compression device 170 may send the compressed neural network to user equipment 140. The user equipment 140 sends the compressed neural network to user equipment 180 (a terminal). Optionally, the compression device 170 may alternatively send the compressed device to the user equipment 180. The user equipment 180 may run the compressed neural network to implement a function of the compressed neural network. The following describes a data processing method in an embodiment of this application with reference to FIG. 7. The method may include but is not limited to some or all of the following steps:

S702: Receive input data.

S704: Input the received data into the compressed neural network, and process the input data by using the compressed neural network, to obtain an output result.

S706: Output the processing result.

The processing result is output in text, image, voice, video, or other modes.

The compressed neural network is obtained through compression by using the neural network compression method described in the foregoing Embodiment 3 or Embodiment 4. The input data may be an image, text, or the like, and is related to a specific function of a to-be-compressed neural network. For compression performed to obtain the compressed neural network, refer to related descriptions in the foregoing Embodiment 3 or Embodiment 4. Details are not described again in this embodiment of this application.

In an application scenario of this embodiment of this application, the data processing method is specifically an image processing method, including: The terminal receives an input image, inputs the input image into the compressed neural network, and processes the input image by using the compressed neural network, to obtain a processing result. Content of the processing result depends on the function of the compressed neural network, and may be an image classification result, an image recognition result, or the like, where the function of the compressed neural network depends on the function of the to-be-compressed neural network. For example, the to-be-compressed neural network is a facial attribute recognition network, and is used to recognize an attribute of a person described in an input face image, for example, a gender, an age. In this case, the compressed neural network can recognize the gender, the age, t, or the like of the person described in the input image, and the processing result may include the gender, the age that is recognized in the input image.

In another application scenario of this embodiment of this application, the data processing method is specifically a text processing method, including: The terminal receives input text, inputs the input text into the compressed neural network, and processes the input text by using the compressed neural network, to obtain a processing result. Content of the processing result depends on the function of the compressed neural network, and may be a text classification result, a text recognition result, or the like, where the function of the compressed neural network depends on the function of the to-be-compressed neural network. For example, the to-be-compressed neural network is a text recognition network, and is used to recognize an intention described in the input text. In this case, the compressed neural network can recognize the intention of the input text, and then perform an operation corresponding to the recognized intention. For example, if the recognized intention is "connecting a call", the terminal (such as a mobile phone) may connect the current call.

The following describes apparatuses in the embodiments of this application with reference to the accompanying drawings.

Figure 8:
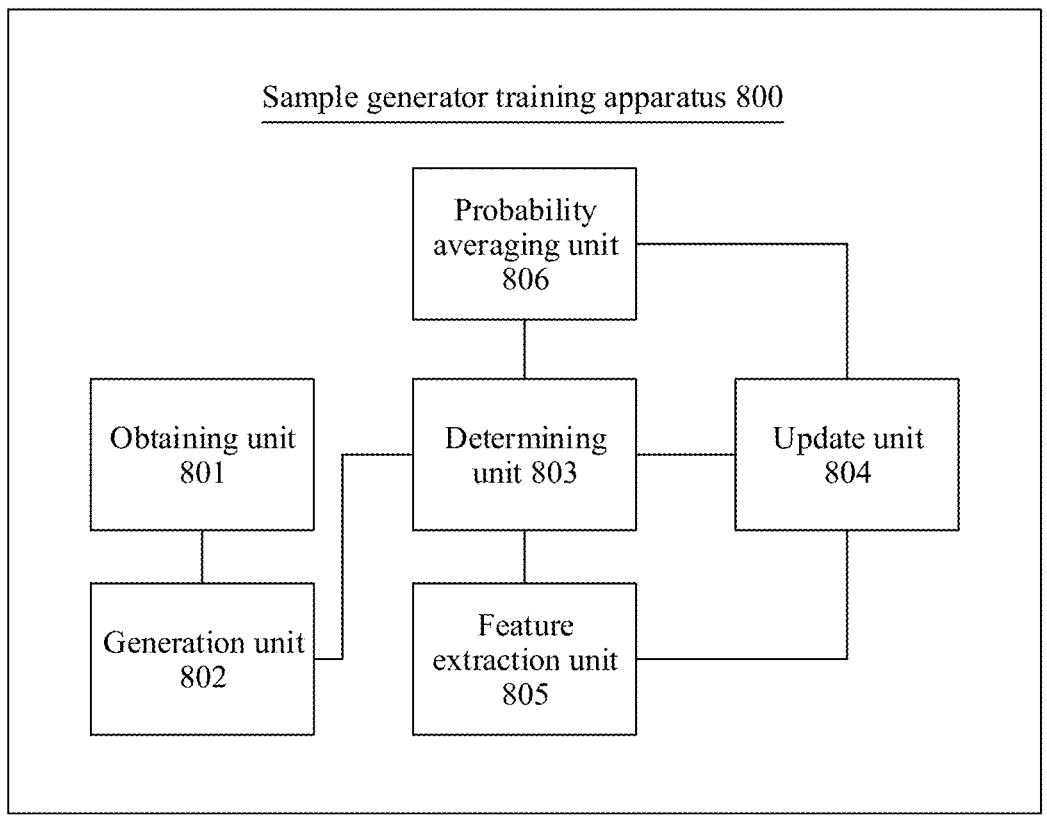
FIG. 8 is a schematic block diagram of a sample generator training apparatus according to an embodiment of the present application.

FIG. 8 is a schematic block diagram of a sample generator training apparatus according to an embodiment of the present application. The sample generator training apparatus 800 shown in FIG. 8 (the apparatus 800 may specifically be the training device 120 in FIG. 1) may include:

an obtaining unit 801, configured to obtain a first matrix;

a generation unit 802, configured to input the first matrix into an initial sample generator to obtain a first generated sample, where the initial sample generator is a deep neural network;

a determining unit 803, configured to input the first generated sample into a preset discriminator to obtain a determining result, where the preset discriminator is obtained through training based on first training data, and the first training data includes a real sample and a category corresponding to the real sample; and an update unit 804, configured to update parameters of the sample generator based on the determining result of the first generated sample to obtain an updated sample generator.

Optionally, the determining result may include a probability that the first generated sample is predicted as each of M categories, and M is an integer greater than 1. Optionally, a real result of the first generated sample may be a category corresponding to a maximum probability in probabilities respectively corresponding to the M categories.

In an optional implementation, the apparatus 800 may further include:

a feature extraction unit 805, configured to extract a feature of the first generated sample by using the preset discriminator; and a probability averaging unit 805, configured to obtain, based on N determining results that one-to-one correspond to N first matrices, an average probability value of each of the M categories in the N determining results.

In this case, the update unit 804 is specifically configured to update the initial sample generator based on a difference between the determining result and the real result, an eigenvalue of the feature, and the average probability value.

Optionally, the update unit 804 is further configured to implement any one of the first to the fourth implementations of the step S410 in the foregoing Embodiment 1. Specifically, refer to related descriptions in the foregoing Embodiment 1. Details are not described again in this embodiment of this application.

For specific implementation of the units in this embodiment of this application, refer to related descriptions in the foregoing Embodiment 1. Details are not described herein again.

Figure 9:
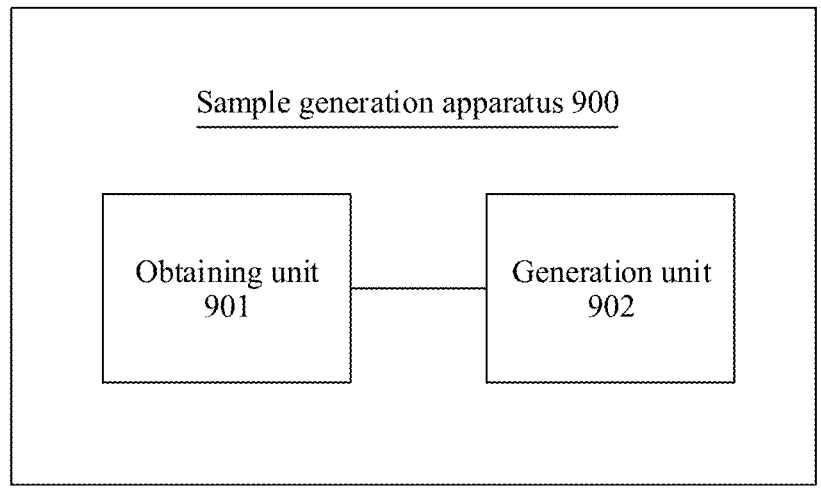
FIG. 9 is a schematic block diagram of a sample generation apparatus according to an embodiment of the present application.

FIG. 9 is a schematic block diagram of a sample generation apparatus according to an embodiment of the present application. The sample generation apparatus 900 shown in FIG. 9 (the apparatus 900 may specifically be the execution device 110 in FIG. 1) may include:

an obtaining unit 901, configured to obtain a target sample generator; and a generation unit 902, configured to input a second matrix into the target sample generator to obtain a second generated sample.

The second matrix and a first matrix have same formats and same types, namely, same orders. A matrix type may be a stochastic matrix, a random vector, or the like. The target sample generator is obtained through training by using the sample generator training method described in Embodiment 1. For a specific training method, refer to related descriptions in the foregoing Embodiment 1. Details are not described herein again.

The sample generation apparatus 900 may receive the target sample generator sent by an apparatus 800, or may train the target sample generator obtained through training by performing the sample generator training method described in Embodiment 1. This is not limited in this embodiment of this application.

For specific implementation of the units in this embodiment of this application, refer to related descriptions in the foregoing Embodiment 2. Details are not described herein again.

Figure 10:
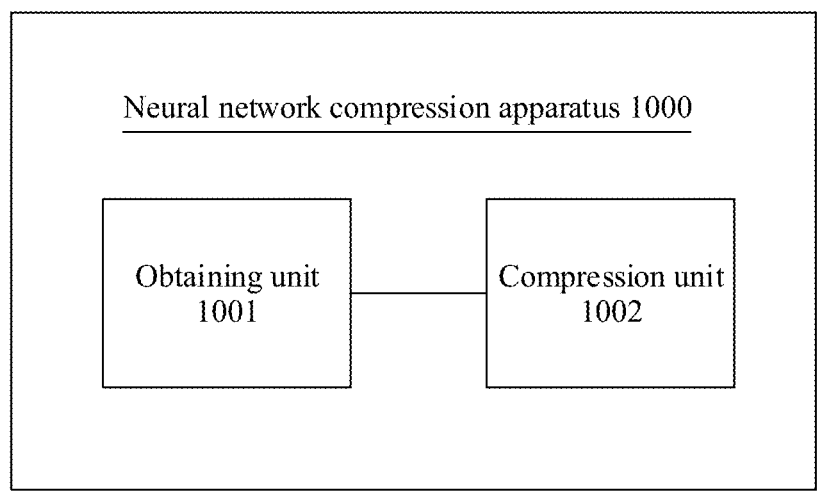
FIG. 10 is a schematic block diagram of a neural network compression apparatus according to an embodiment of the present application.

FIG. 10 is a schematic block diagram of a neural network compression apparatus according to an embodiment of the present application. The neural network compression apparatus 1000 shown in FIG. 10 (the apparatus 1000 may specifically be the compression device 170 in FIG. 1) may include: an obtaining unit 1001 and a compression unit 1002.

The obtaining unit 1001 is configured to obtain a second generated sample, and may be specifically configured to receive the second generated sample sent by a sample generation apparatus 900.

The second generated sample may be obtained by an execution device 110 or the sample generation apparatus 900 by inputting a second matrix into the target sample generator. The second generated sample uses a to-be-compressed neural network as a preset discriminator. The target sample generator is obtained through training by using the foregoing sample generator training method. For specific implementation, refer to related descriptions in the foregoing Embodiment 1. Details are not described herein again.

The compression unit 1002 is configured to: replace the real sample with the second generated sample, use, as a category corresponding to the second generated sample, an output obtained after the second generated sample is input into the to-be-compressed neural network, and compress the to-be-compressed neural network.

For specific implementation of the functional units, refer to related descriptions in the foregoing Embodiment 3 and/or Embodiment 4. Details are not described again in this embodiment of this application.

Figure 11:
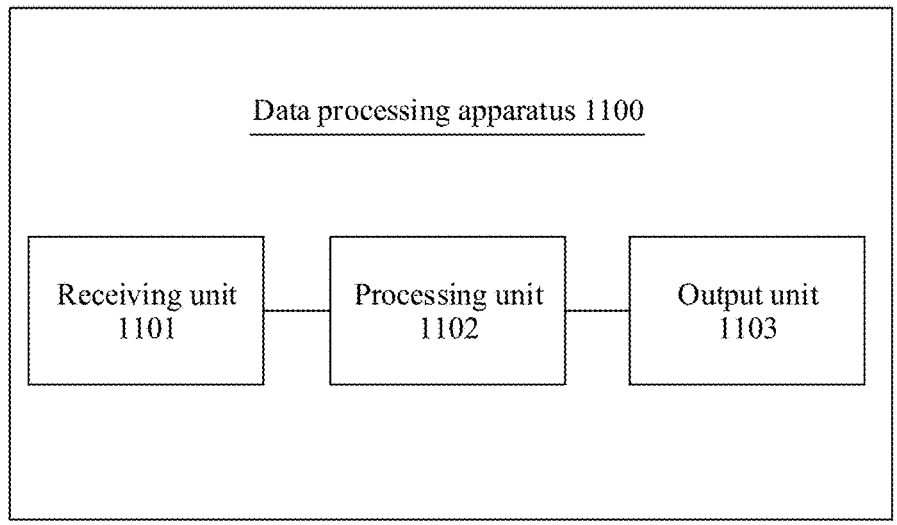
FIG. 11 is a schematic block diagram of a data processing apparatus according to an embodiment of the present application.

FIG. 11 is a schematic block diagram of a data processing apparatus 1100 (terminal) according to an embodiment of the present application. The data processing apparatus 1100 shown in FIG. 11 (the apparatus 1100 may specifically be the user equipment 180 in FIG. 1) may include:

a receiving unit 1101, configured to receive input data;

a processing unit 1102, configured to: input the input data into a compressed neural network, and process the input data by using the compressed neural network, to obtain a processing result, where the compressed neural network is obtained by using the neural network compression method according to claim 15; and an output unit 1103, configured to output the processing result.

For specific implementation of the functional units, refer to related descriptions in the foregoing Embodiment 5. Details are not described again in this embodiment of this application.

Figure 12:
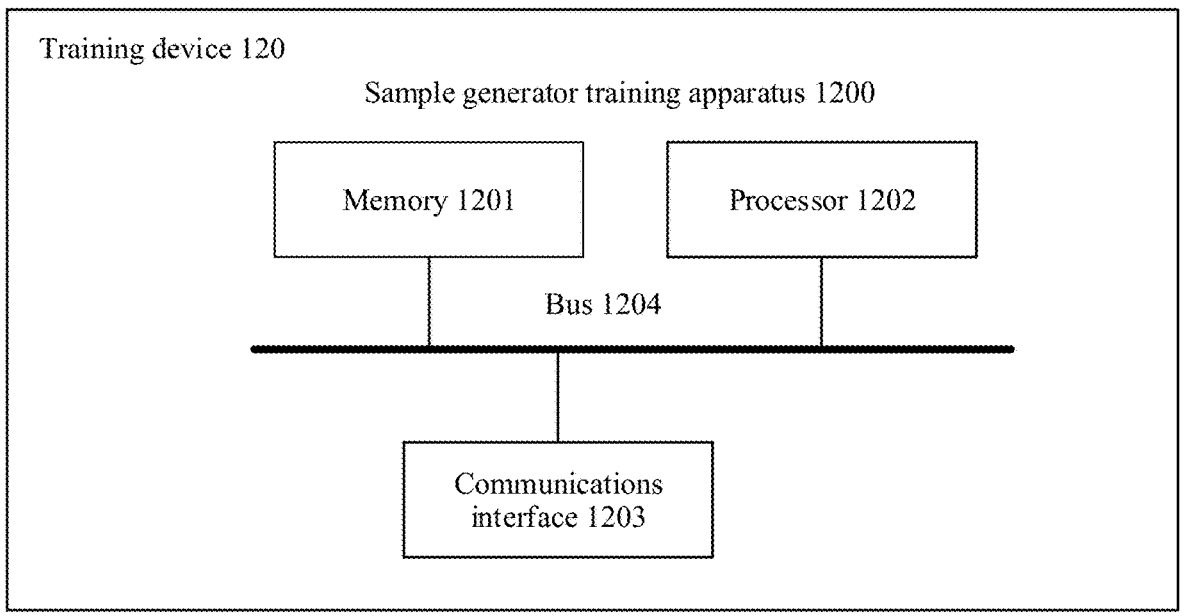
FIG. 12 is a schematic block diagram of another sample generator training apparatus according to an embodiment of the present application.

FIG. 12 is a schematic diagram of a hardware structure of a sample generator training apparatus according to an embodiment of this application. The sample generator training apparatus 1200 shown in FIG. 12 (the apparatus 1200 may specifically be a computer device) includes a memory 1201, a processor 1202, a communications interface 1203, and a bus 1204. Communication connections between the memory 1201, the processor 1202, and the communications interface 1203 are implemented through the bus 1204.

The memory 1201 may be a read-only memory (Read Only Memory, ROM), a static storage device, a dynamic storage device, or a random access memory (Random Access Memory, RAM). The memory 1201 may store a program. When the program stored in the memory 1201 is executed by the processor 1202, the processor 1202 and the communications interface 1203 are configured to perform the steps of the sample generator training method in Embodiment 1 of this application.

The processor 1202 may be a general-purpose central processing unit (Central Processing Unit, CPU), a microprocessor, an application-specific integrated circuit (Application Specific Integrated Circuit, ASIC), a graphics processing unit (graphics processing unit, GPU), or one or more integrated circuits, and is configured to execute a related program, to implement functions that need to be performed by the units in the sample generator training apparatus in this embodiment of this application, or perform the sample generator training method in the method embodiments of this application.

The processor 1202 may alternatively be an integrated circuit chip and has a signal processing capability. In an implementation process, the steps of the sample generator training method in this application may be completed by using a hardware integrated logic circuit in the processor 1202 or an instruction in a form of software. The processor 1202 may alternatively be a general-purpose processor, a digital signal processor (Digital Signal Processing, DSP), an application-specific integrated circuit (ASIC), a field programmable gate array (Field Programmable Gate Array, FPGA) or another programmable logic device, a discrete gate or transistor logic device, or a discrete hardware component. The processor 1202 may implement or perform the methods, the steps, and the logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware coding processor, or may be executed and accomplished by using a combination of hardware and software modules in the coding processor. A software module may be located in a mature storage medium in the art, such as a random access memory, a flash memory, a read-only memory, a programmable read-only memory, an electrically erasable programmable memory, or a register. The storage medium is located in the memory 1201. The processor 1202 reads information in the memory 1201, and completes, in combination with hardware of the processor 1202, the functions that need to be performed by the units included in the sample generator training apparatus in this embodiment of this application, or performs the sample generator training method in the method embodiments of this application.

The communications interface 1203 uses a transceiver apparatus, for example, but not limited to, a transceiver, to implement communication between the apparatus 1200 and another device or a communications network. For example, training data (for example, the first matrix in Embodiment 1 of this application) and a preset discriminator may be obtained through the communications interface 1203.

The bus 1204 may include a path for information transfer between various components (for example, the memory 1201, the processor 1202, and the communications interface 1203) of the apparatus 1200.

It should be understood that an obtaining unit 801 in a sample generator training apparatus 800 may be equivalent to the communications interface 1203 in the sample generator training apparatus 1200, and a generation unit 802, a determining unit 803, and an update unit 804 in the sample generator training apparatus 800 may be equivalent to the processor 1202 in the sample generator training apparatus 1200.

For specific implementation of the functional components, refer to related descriptions in the foregoing Embodiment 1. Details are not described again in this embodiment of this application.

Figure 13:
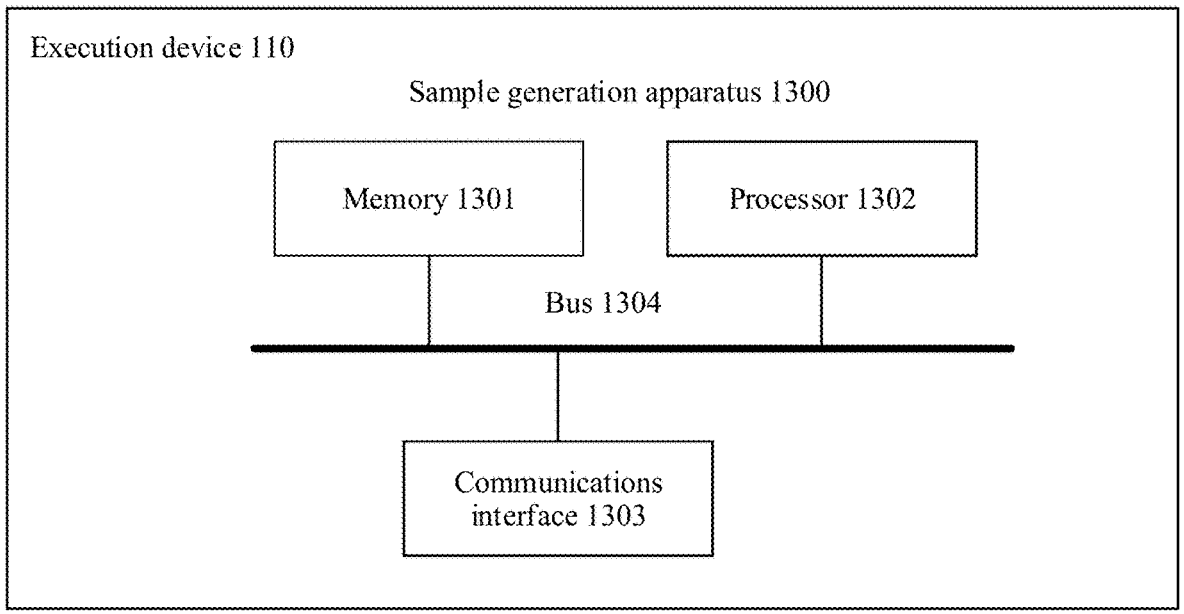
FIG. 13 is a schematic block diagram of another sample generation apparatus according to an embodiment of the present application.

FIG. 13 is a schematic block diagram of another sample generation apparatus according to an embodiment of the present application. The sample generation apparatus 1300 shown in FIG. 13 (the apparatus 1300 may specifically be a computer device) includes a memory 1301, a processor 1302, a communications interface 1303, and a bus 1304. Communication connections between the memory 1301, the processor 1302, and the communications interface 1303 are implemented through the bus 1304.

The memory 1301 may be a read-only memory (Read Only Memory, ROM), a static storage device, a dynamic storage device, or a random access memory (Random Access Memory, RAM). The memory 1301 may store a program. When the program stored in the memory 1301 is executed by the processor 1302, the processor 1302 and the communications interface 1303 are configured to perform the steps of the sample generator training method in Embodiment 2 of this application.

The processor 1302 may be a general-purpose central processing unit (Central Processing Unit, CPU), a microprocessor, an application-specific integrated circuit (Application Specific Integrated Circuit, ASIC), a graphics processing unit (graphics processing unit, GPU), or one or more integrated circuits, and is configured to execute a related program, to implement functions that need to be performed by the units in the sample generation apparatus 1300 in this embodiment of this application, or perform the sample generation method in Method Embodiment 2 of this application.

The processor 1302 may alternatively be an integrated circuit chip and has a signal processing capability. In an implementation process, the steps of the sample generation method in this application may be completed by using a hardware integrated logic circuit in the processor 1302 or an instruction in a form of software. The processor 1302 may alternatively be a general-purpose processor, a digital signal processor (Digital Signal Processing, DSP), an application-specific integrated circuit (ASIC), a field programmable gate array (Field Programmable Gate Array, FPGA) or another programmable logic device, a discrete gate or transistor logic device, or a discrete hardware component. The processor 1302 may implement or perform the methods, the steps, and the logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware coding processor, or may be executed and accomplished by using a combination of hardware and software modules in the coding processor. A software module may be located in a mature storage medium in the art, such as a random access memory, a flash memory, a read-only memory, a programmable read-only memory, an electrically erasable programmable memory, or a register. The storage medium is located in the memory 1301. The processor 1302 reads information in the memory 1301, and completes, in combination with hardware of the processor 1302, the functions that need to be performed by the units included in the sample generation apparatus in this embodiment of this application, or performs the sample generation method in the method embodiments of this application.

The communications interface 1303 uses a transceiver apparatus, for example, but not limited to, a transceiver, to implement communication between the apparatus 1300 and another device or a communications network. For example, data (for example, the second matrix in Embodiment 1 of this application), a preset discriminator, or a to-be-compressed neural network may be obtained through the communications interface 1303.

The bus 1304 may include a path for information transfer between various components (for example, the memory 1301, the processor 1302, and the communications interface 1303) of the apparatus 1300.

It should be understood that an obtaining unit 901 in a sample generation apparatus 900 is equivalent to the communications interface 1303 in the sample generation apparatus 1300, and a generation unit 902 in the sample generation apparatus 900 may be equivalent to the processor 1302 in the sample generation apparatus 1300.

For specific implementation of the functional units, refer to related descriptions in the foregoing Embodiment 2. Details are not described again in this embodiment of this application.

Figure 14:
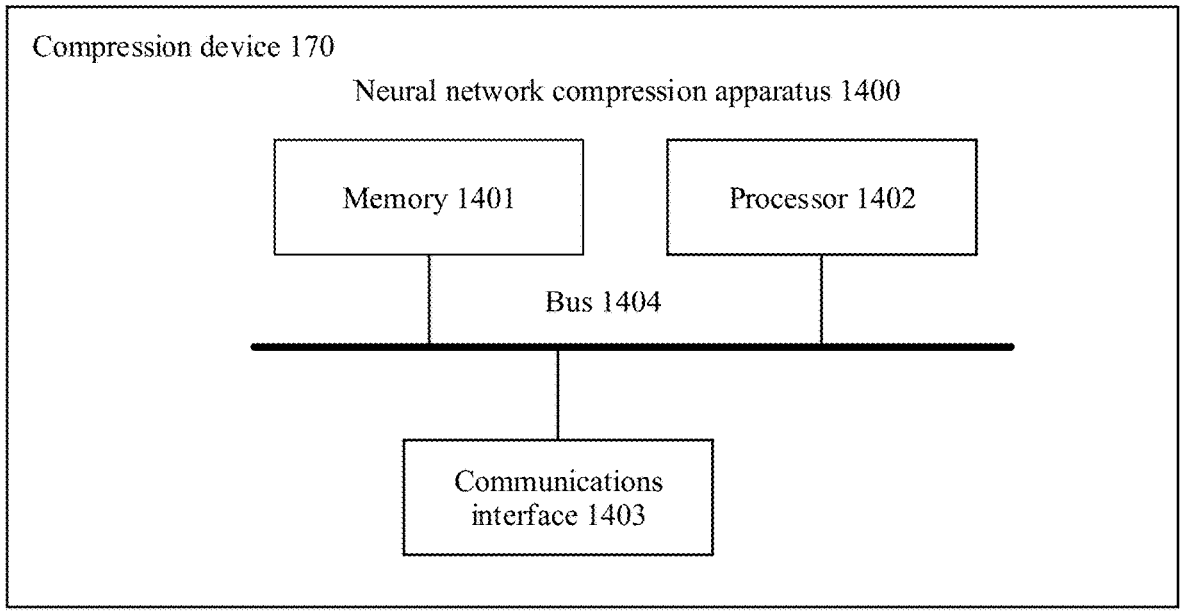
FIG. 14 is a schematic block diagram of another neural network compression apparatus according to an embodiment of the present application.

FIG. 14 is a schematic diagram of a hardware structure of another neural network compression apparatus according to an embodiment of the present application. The neural network compression apparatus 1400 shown in FIG. 14 (the apparatus 1400 may specifically be a computer device) includes a memory 1401, a processor 1402, a communications interface 1403, and a bus 1404. Communication connections between the memory 1401, the processor 1402, and the communications interface 1403 are implemented through the bus 1404.

The memory 1401 may be a read-only memory (Read Only Memory, ROM), a static storage device, a dynamic storage device, or a random access memory (Random Access Memory, RAM). The memory 1401 may store a program. When the program stored in the memory 1401 is executed by the processor 1402, the processor 1402 and the communications interface 1403 are configured to perform the steps of the neural network compression in Embodiment 3 and Embodiment 4 of this application.

The processor 1402 may be a general-purpose central processing unit (Central Processing Unit, CPU), a microprocessor, an application-specific integrated circuit (Application Specific Integrated Circuit, ASIC), a graphics processing unit (graphics processing unit, GPU), or one or more integrated circuits, and is configured to execute a related program, to implement functions that need to be performed by the units in the neural network compression apparatus in this embodiment of this application, or perform the neural network compression method in the method embodiments of this application.

The processor 1402 may alternatively be an integrated circuit chip and has a signal processing capability. In an implementation process, the steps of the neural network compression method in this application may be completed by using a hardware integrated logic circuit in the processor 1402 or an instruction in a form of software. The processor 1402 may alternatively be a general-purpose processor, a digital signal processor (Digital Signal Processing, DSP), an application-specific integrated circuit (ASIC), a field programmable gate array (Field Programmable Gate Array, FPGA) or another programmable logic device, a discrete gate or transistor logic device, or a discrete hardware component. The processor 1402 may implement or perform the methods, the steps, and the logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware coding processor, or may be executed and accomplished by using a combination of hardware and software modules in the coding processor. A software module may be located in a mature storage medium in the art, such as a random access memory, a flash memory, a read-only memory, a programmable read-only memory, an electrically erasable programmable memory, or a register. The storage medium is located in the memory 1401. The processor 1402 reads information in the memory 1401, and completes, in combination with hardware of the processor 1402, the functions that need to be performed by the units included in the neural network compression apparatus 900 in this embodiment of this application, or performs the neural network compression method in the method embodiments of this application.

The communications interface 1403 uses a transceiver apparatus, for example, but not limited to, a transceiver, to implement communication between the apparatus 1400 and another device or a communications network. For example, data (for example, the second generated sample in Embodiment 3 or Embodiment 4 of this application) and a to-be-compressed neural network may be obtained through the communications interface 1403.

The bus 1404 may include a path for information transfer between various components (for example, the memory 1401, the processor 1402, and the communications interface 1403) of the apparatus 1400.

It should be understood that an obtaining unit 901 in a neural network compression apparatus 1000 is equivalent to the communications interface 1403 in the neural network compression apparatus 1400, and a compression unit 1005 in the neural network compression apparatus 1000 may be equivalent to the processor 1402 in the neural network compression apparatus 1400.

For specific implementation of the functional units, refer to related descriptions in the foregoing Embodiment 3 and/or Embodiment 4. Details are not described again in this embodiment of this application.

Figure 15:
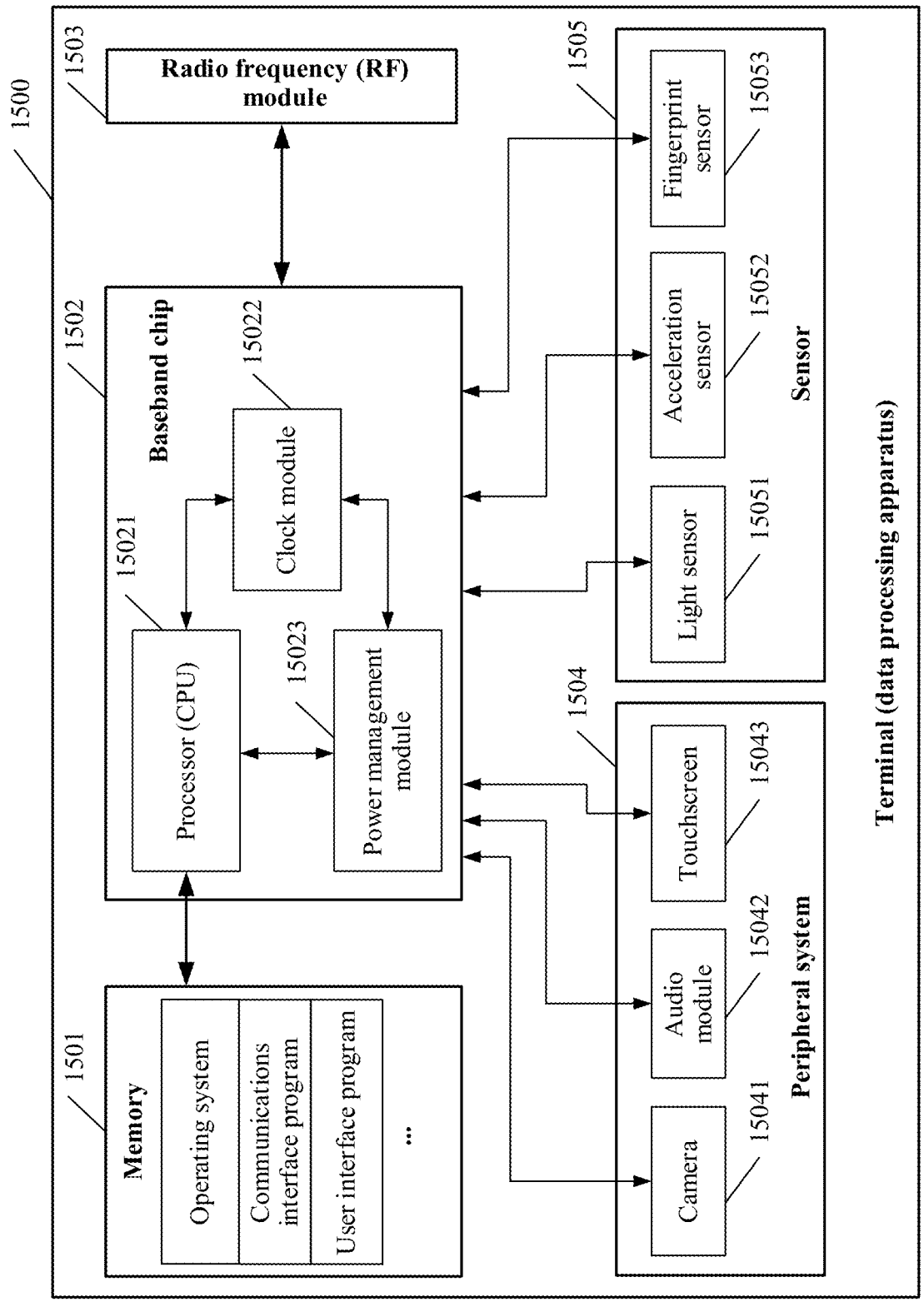
FIG. 15 is a schematic block diagram of another data processing apparatus according to an embodiment of the present application.

FIG. 15 is a schematic block diagram of another data processing apparatus according to an embodiment of the present application. The data processing apparatus 1500 shown in FIG. 15 (the apparatus 1500 may specifically be a terminal) includes a memory 1501, a baseband chip 1502, a radio frequency module 1503, a peripheral system 1504, and a sensor 1505. The baseband chip 1502 includes at least one processor 15021 such as a CPU, a clock module 15022, and a power management module 15023. The peripheral system 1504 includes a camera 15041, an audio module 15042, a touchscreen 15043, and the like. Further, the sensor 1505 may include a light sensor 15051, an acceleration sensor 15052, a fingerprint sensor 15053, and the like. Modules included in the peripheral system 1504 and the sensor 1505 may be increased or reduced based on an actual requirement. Any two connected modules may be specifically connected through a bus. The bus may be an industry standard architecture (English: industry standard architecture, ISA for short) bus, a peripheral component interconnect (English: peripheral component interconnect, PCI for short) bus, an extended industry standard architecture (English: extended industry standard architecture, EISA for short) bus, or the like.

The radio frequency module 1503 may include an antenna and a transceiver (including a modem). The transceiver is configured to convert an electromagnetic wave received by the antenna into a current, and finally convert the current into a digital signal. Correspondingly, the transceiver is further configured to convert a digital signal to be output by the mobile phone into a current, then convert the current into an electromagnetic wave, and finally transmit the electromagnetic wave to free space by using the antenna. The radio frequency module 1503 may further include at least one amplifier configured to amplify a signal. Generally, the radio frequency module 1503 may be used for wireless transmission, for example, Bluetooth (English: Bluetooth) transmission, wireless-fidelity (English: Wireless-Fidelity, WI-FI for short) transmission, third generation mobile communication technology (3rd-Generation, 3G for short) transmission, and fourth generation mobile communication technology (English: the 4th Generation mobile communication, 4G for short) transmission.

The touchscreen 15043 may be configured to display information entered by a user or display information for the user. The touchscreen 15043 may include a touch panel and a display panel. Optionally, the display panel may be configured in a form of a liquid crystal display (English: Liquid Crystal Display, LCD for short), an organic light-emitting diode (English: Organic Light-Emitting Diode, OLED for short), or the like. Further, the touch panel may cover the display panel. When detecting a touch operation on or near the touch panel, the touch panel transmits the touch operation to the processor 15021 to determine a type of a touch event. Then, the processor 15021 provides a corresponding visual output on the display panel based on the type of the touch event. The touch panel and the display panel are used as two independent components to implement input and input functions of the terminal 1500. However, in some embodiments, the touch panel and the display panel may be integrated to implement the input and output functions of the terminal 1500.

The camera 15041 is configured to obtain an image, to input the image into a compressed neural network. It should be understood that, in this case, the compressed neural network is a deep neural network used to process the image, for example, a neural network obtained after the image recognition network in the scenario A is compressed.

The audio input module 15042 may specifically be a microphone, and may obtain a voice. In this embodiment, the terminal 1500 may convert the voice into text, and then input the text into the compressed neural network. It should be understood that, in this case, the compressed neural network is a deep neural network used to process the text, for example, a neural network obtained after the text recognition network in the scenario C is compressed.

The sensor 1505 may include the light sensor 15051, the acceleration sensor 15052, and the fingerprint sensor 15052. The light sensor 15051 is configured to obtain light intensity of an environment. The acceleration sensor 15052 (such as a gyroscope) may obtain a motion status of the terminal 1500. The fingerprint sensor 15053 may obtain input fingerprint information. After sensing a related signal, the sensor 1505 quantizes the signal to a digital signal, and transfers the digital signal to the processor 15021 for further processing.

The memory 1501 may be a high-speed RAM memory, or may be a non-volatile memory (non-volatile memory), for example, at least one magnetic disk memory. Optionally, the memory 1501 may further include at least one storage apparatus far away from the processor 15021. The memory 1501 may specifically include an instruction storage area and a data storage area. The instruction storage area may store a program such as an operating system, a user interface program, or a communications interface program. The data storage area may store data for performing a related operation during the processing, or data generated when the related operation is performed.

As a control center of the terminal 1500, the processor 15021 connects all parts of the entire mobile phone through various interfaces and lines, and runs the program stored in the memory 1501 and invokes the data stored in the memory 1501 to perform various functions of the terminal 1500. Optionally, the processor 15021 may include one or more application processors. The application processor mainly processes the operating system, a user interface, an application program, and the like. In this embodiment of this application, the processor 15021 reads information in the memory 1501, and completes, in combination with hardware of the processor 15021, functions that need to be performed by the units included in the data processing apparatus 1100 in this embodiment of this application, or performs the data processing method in the method embodiments of this application.

The user implements a communication function of the terminal 1500 by using the radio frequency module 1503. Specifically, the terminal 1500 may receive the compressed neural network or other data that is sent by user equipment 180 or a compression apparatus 170.

It should be noted that, for specific implementations and beneficial effects of the foregoing operations, refer to corresponding descriptions in the user interface embodiments provided in FIG. 2 to FIG. 14 and possible embodiments of the user interface embodiments.

For specific implementation of the functional units, refer to related descriptions in the foregoing Embodiment 5. Details are not described again in this embodiment of this application.

It should be noted that although only the memory, the processor, and the communications interface are shown for each of the apparatuses 1200, 1300, 1400, and 1500 shown in FIG. 12, FIG. 13, FIG. 14, and FIG. 15, in a specific implementation process, a person skilled in the art should understand that the apparatuses 1200, 1300, 1400, and 1500 further include other components necessary for normal running. In addition, a person skilled in the art should understand that the apparatuses 1200, 1300, 1400, and 1500 may further include, based on a specific requirement, hardware components for implementing other additional functions. In addition, a person skilled in the art should understand that the apparatuses 1200, 1300, 1400, and 1500 each may include only components necessary for implementing the embodiments of this application, but not necessarily include all the components shown in FIG. 12, FIG. 13, FIG. 14, or FIG. 15.

It may be understood that the apparatus 1200 is equivalent to the training device 120 in FIG. 1, the apparatus 1300 is equivalent to the execution device 110 in FIG. 1, the apparatus 1400 is equivalent to the compression device 170 in FIG. 1, and the apparatus 1500 is equivalent to the user equipment 180 in FIG. 1. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art can understand that, the functions described with reference to various illustrative logical blocks, modules, and algorithm steps disclosed and described in this specification can be implemented by hardware, software, firmware, or any combination thereof. If implemented in software, the functions described with reference to the illustrative logical blocks, modules, and steps may be stored or transmitted on a computer-readable medium as one or more instructions or code and executed by a hardware-based processing unit. The computer-readable medium may include a computer-readable storage medium, and the computer-readable storage medium corresponds to a tangible medium, for example, a data storage medium, or includes any communications medium that facilitates transmission of a computer program from one place to another (for example, according to a communications protocol). In this manner, the computer-readable medium may be generally corresponding to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example and not by way of limitation, this computer-readable storage medium may include a RAM, a ROM, an EEPROM, a CD-ROM or another optical disk storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave are included in a definition of a medium. However, it should be understood that the computer-readable storage medium and the data storage medium do not include connections, carriers, signals, or other transitory media, but are actually non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable medium.

An instruction may be executed by one or more processors such as one or more digital signal processors (DSP), general-purpose microprocessors, application-specific integrated circuits (ASIC), field programmable logic arrays (FPGA), or other equivalent integrated circuit or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image generation method, comprising:
inputting a first matrix into an initial image generator to obtain a generated image, wherein the initial image generator is a deep neural network, and the first matrix does not contain image data;
inputting the generated image into a preset discriminator to obtain a determining result, wherein the preset discriminator is obtained through training based on first training data, and the first training data comprises a real image and a category corresponding to the real image;
updating the initial image generator based on the determining result to obtain a target image generator; and
inputting a second matrix into the target image generator to obtain a sample image, wherein the second matrix is a same type and format as the first matrix.

2. The method according to claim 1, wherein the determining result comprises a probability that the generated image is predicted as each of M categories, and M is an integer greater than 1.

3. The method according to claim 2, wherein the updating the initial image generator based on the determining result specifically comprises:
determining a maximum probability in probabilities corresponding to the M categories, and determining, as a real result of the generated image, a category corresponding to the maximum probability; and updating the initial image generator based on a difference between the determining result and the real result.

4. The method according to claim 2, wherein before the updating the initial image generator based on the determining result, the method further comprises:

extracting a feature of the generated image by using the preset discriminator; and the updating the initial image generator based on the determining result specifically comprises:

determining a maximum probability in probabilities corresponding to the M categories, and determining, as a real result of the generated image, a category corresponding to the maximum probability; and updating the initial image generator based on the feature and a difference between the determining result and the real result.

5. The method according to claim 2, wherein the updating the initial image generator based on the determining result specifically comprises:

determining a maximum probability in probabilities corresponding to the M categories, and determining, as a real result of the generated image, a category corresponding to the maximum probability;

obtaining, based on N determining results that one-to-one correspond to N first matrices, an average probability value of each of the M categories in the N determining results, wherein N is a positive integer; and updating the initial image generator based on the average probability value and a difference between the determining result and the real result.

6. The method according to claim 2, wherein before the updating the initial image generator based on the determining result, the method further comprises:

extracting a feature of the generated image by using the preset discriminator; and the updating the initial image generator based on the determining result specifically comprises:

determining a maximum probability in probabilities corresponding to the M categories, and determining, as a real result of the generated image, a category corresponding to the maximum probability; obtaining, based on N determining results that one-to-one correspond to N first matrices, an average probability value of each of the M categories in the N determining results; and updating the initial image generator based on a difference between the determining result and the real result, an eigenvalue of the feature, and the average probability value.

7. A sample generation method, comprising:

inputting a first matrix into an initial sample generator to obtain a first generated sample, wherein the initial sample generator is a deep neural network, and the first matrix does not contain image data;

inputting the first generated sample into a preset discriminator to obtain a determining result, wherein the preset discriminator is obtained through training based on first training data, and the first training data comprises a real sample and a category corresponding to the real sample;

updating parameters of the initial sample generator based on the determining result of the first generated sample to obtain a target sample generator; and inputting a second matrix into the target sample generator to obtain a second generated sample, wherein the second matrix is a same type and format as the first matrix.

8. The method according to claim 7, wherein the determining result comprises a probability that the first generated sample is predicted as each of M categories, and M is an integer greater than 1.

9. The method according to claim 8, wherein the updating the initial sample generator based on the determining result specifically comprises:

determining a maximum probability in probabilities corresponding to the M categories, and determining, as a real result of the first generated sample, a category corresponding to the maximum probability; and updating the initial sample generator based on a difference between the determining result and the real result.

10. The method according to claim 8, wherein before the updating the initial sample generator based on the determining result, the method further comprises:

extracting a feature of the first generated sample by using the preset discriminator; and the updating the initial sample generator based on the determining result specifically comprises:

determining a maximum probability in probabilities corresponding to the M categories, and determining, as a real result of the first generated sample, a category corresponding to the maximum probability; and updating the initial sample generator based on the feature and a difference between the determining result and the real result.

11. The method according to claim 8, wherein the updating the initial sample generator based on the determining result specifically comprises:

determining a maximum probability in probabilities corresponding to the M categories, and determining, as a real result of the first generated sample, a category corresponding to the maximum probability;

obtaining, based on N determining results that one-to-one correspond to N first matrices, an average probability value of each of the M categories in the N determining results, wherein N is a positive integer; and updating the initial sample generator based on the average probability value and a difference between the determining result and the real result.

12. The method according to claim 8, wherein before the updating the initial sample generator based on the determining result, the method further comprises:

extracting a feature of the first generated sample by using the preset discriminator; and the updating the initial sample generator based on the determining result specifically comprises:

determining a maximum probability in probabilities corresponding to the M categories, and determining, as a real result of the first generated sample, a category corresponding to the maximum probability; obtaining, based on N determining results that one-to-one correspond to N first matrices, an average probability value of each of the M categories in the N determining results; and updating the initial sample generator based on a difference between the determining result and the real result, the feature, and the average probability value.

13. An image generation apparatus, comprising a memory and a processor, wherein the memory is configured to store a program, the processor is configured to execute the program stored in the memory, and when the program stored in the memory is executed, the processor is configured to perform an image generation method, the method comprising:

inputting a first matrix into an initial image generator to obtain a generated image, wherein the initial image generator is a deep neural network, and the first matrix does not contain image data;

inputting the generated image into a preset discriminator to obtain a determining result, wherein the preset discriminator is obtained through training based on first training data, and the first training data comprises a real image and a category corresponding to the real image;

updating the initial image generator based on the determining result to obtain a target image generator; and inputting a second matrix into the target image generator to obtain a sample image, wherein the second matrix is a same type and format as the first matrix.

14. The apparatus according to claim 13, wherein the determining result comprises a probability that the generated image is predicted as each of M categories, and M is an integer greater than 1.

15. The apparatus according to claim 14, wherein the updating the initial image generator based on the determining result specifically comprises:

determining a maximum probability in probabilities corresponding to the M categories, and determining, as a real result of the generated image, a category corresponding to the maximum probability; and updating the initial image generator based on a difference between the determining result and the real result.

16. The apparatus according to claim 14, wherein before the updating the initial image generator based on the determining result, the method further comprises:

extracting a feature of the generated image by using the preset discriminator; and the updating the initial image generator based on the determining result specifically comprises:

determining a maximum probability in probabilities corresponding to the M categories, and determining, as a real result of the generated image, a category corresponding to the maximum probability; and updating the initial image generator based on the feature and a difference between the determining result and the real result.

17. The apparatus according to claim 14, wherein the updating the initial image generator based on the determining result specifically comprises:

determining a maximum probability in probabilities corresponding to the M categories, and determining, as a real result of the generated image, a category corresponding to the maximum probability;

obtaining, based on N determining results that one-to-one correspond to N first matrices, an average probability value of each of the M categories in the N determining results, wherein N is a positive integer; and updating the initial image generator based on the average probability value and a difference between the determining result and the real result.

18. The apparatus according to claim 14, wherein before the updating the initial image generator based on the determining result, the method further comprises:

extracting a feature of the generated image by using the preset discriminator; and the updating the initial image generator based on the determining result specifically comprises:

determining a maximum probability in probabilities corresponding to the M categories, and determining, as a real result of the generated image, a category corresponding to the maximum probability; obtaining, based on N determining results that one-to-one correspond to N first matrices, an average probability value of each of the M categories in the N determining results; and updating the initial image generator based on a difference between the determining result and the real result, an eigenvalue of the feature, and the average probability value.

19. A computer-readable storage medium, wherein the computer-readable storage medium stores program code to be executed by a device, and the program code comprises the image generation method according to claim 1.

20. A computer-readable storage medium, wherein the computer-readable storage medium stores program code to be executed by a device, and the program code comprises the sample generation method according to claim 7.

* * * * *